(12) United States Patent
Ashfaq et al.

(10) Patent No.: US 10,590,499 B2
(45) Date of Patent: Mar. 17, 2020

(54) ANIMAL SKIN SUBSTRATE TREATMENT METHOD AND APPARATUS

(71) Applicant: Xeros Limited, Rotherham, South Yorkshire (GB)

(72) Inventors: Mohammed Ashfaq, Rotherham (GB); Anthony Stewart, Rotherham (GB); Michael David Sawford, Rotherham (GB)

(73) Assignee: Xeros Limited, Rotherham, South Yorkshire (GB)

( * ) Notice: Subject to any disclaimer, the term of this patent is extended or adjusted under 35 U.S.C. 154(b) by 0 days.

(21) Appl. No.: 16/093,449

(22) PCT Filed: Apr. 13, 2017

(86) PCT No.: PCT/GB2017/051051
§ 371 (c)(1),
(2) Date: Oct. 12, 2018

(87) PCT Pub. No.: WO2017/178834
PCT Pub. Date: Oct. 19, 2017

(65) Prior Publication Data
US 2019/0144959 A1    May 16, 2019

(30) Foreign Application Priority Data
Apr. 13, 2016   (GB) .................................. 1606404.0

(51) Int. Cl.
*C14C 15/00*        (2006.01)
*B01D 29/78*        (2006.01)
(Continued)

(52) U.S. Cl.
CPC .............. *C14C 15/00* (2013.01); *B01D 29/78* (2013.01); *B08B 3/044* (2013.01); *B08B 7/02* (2013.01); *C02F 1/004* (2013.01); *C02F 2103/24* (2013.01)

(58) Field of Classification Search
CPC . C14C 15/00; C14C 3/04; C02F 1/007; B08B 3/044; B08B 7/02; B08B 1/04; B01D 36/04; B01D 46/10
See application file for complete search history.

(56) References Cited

U.S. PATENT DOCUMENTS 8,959,961 B2   2/2015   Jenkins et al.
8,974,545 B2   3/2015   Burkinshaw et al.
(Continued)

FOREIGN PATENT DOCUMENTS

CN   102061589 A   5/2011
CN   202175862 U   3/2012
(Continued)

OTHER PUBLICATIONS

U.S. Appl. No. 16/093,398, filed Oct. 12, 2018, Xeros Ltd.
(Continued)

*Primary Examiner* — Eisa B Elhilo
(74) *Attorney, Agent, or Firm* — Clark & Elbing LLP

(57) ABSTRACT

A method of treating an animal skin substrate comprising: agitating the animal skin substrate with a solid particulate material and a treatment liquor; separating the animal skin substrate from effluent comprising the solid particulate material, the treatment liquor and solid waste fragments derived from said substrate; transferring the effluent to a first separator, wherein the first separator is configured to allow the treatment liquor and at least a portion of the solid waste fragments to pass through the first separator but to prevent the solid particulate material from passing through the first
(Continued)

separator, and providing a first filtrate stream comprising treatment liquor and solid waste fragments and a first residue comprising solid particulate material and residual solid waste fragments treating said first residue to remove said residual solid waste fragments to provide cleaned solid particulate material, wherein said treating of said first residue comprises retaining said solid particulate material on a surface of a treatment separator during said treating, wherein the treatment separator is configured to allow liquid and residual solid waste fragments to pass through but to prevent the solid particulate material from passing through; and (i) directing a cleaning formulation onto said solid particulate material to provide a second filtrate stream comprising said cleaning formulation and said residual solid waste fragments and a second residue comprising cleaned solid particulate material; and/or (ii) agitating the treatment separator.

29 Claims, 6 Drawing Sheets

(51) Int. Cl.
   *B08B 3/04* (2006.01)
   *B08B 7/02* (2006.01)
   *C02F 1/00* (2006.01)
   *C02F 103/24* (2006.01)

(56) References Cited

U.S. PATENT DOCUMENTS

| | | | |
|---|---|---|---|
| 9,017,423 | B2 | 4/2015 | Burkinshaw et al. |
| 9,121,000 | B2 | 9/2015 | Burkinshaw et al. |
| 9,127,882 | B2 | 9/2015 | Jenkins et al. |
| 9,297,107 | B2 | 3/2016 | Jenkins |
| 9,315,766 | B2 | 4/2016 | He et al. |
| 9,404,210 | B2 | 8/2016 | He et al. |
| 9,410,278 | B2 | 8/2016 | He et al. |
| 9,476,155 | B2 | 10/2016 | He et al. |
| 9,487,898 | B2 | 11/2016 | He et al. |
| 9,523,169 | B2 | 12/2016 | Sawford et al. |
| 9,550,966 | B2 | 1/2017 | Burkinshaw et al. |
| 9,587,337 | B2 | 3/2017 | He et al. |
| 9,587,340 | B2 | 3/2017 | Jenkins et al. |
| 9,631,314 | B2 | 4/2017 | Yin et al. |
| 9,803,307 | B2 | 10/2017 | Jenkins et al. |
| 9,834,881 | B2 | 12/2017 | Sawford et al. |
| 9,845,516 | B2 | 12/2017 | Steele |
| 9,850,455 | B2 | 12/2017 | Jenkins et al. |
| 9,850,619 | B2 | 12/2017 | Wells et al. |
| 9,914,901 | B2 | 3/2018 | Burkinshaw et al. |
| 9,932,700 | B2 | 4/2018 | Wells et al. |
| 10,017,895 | B2 | 7/2018 | Wells et al. |
| 10,081,900 | B2 | 9/2018 | Wells et al. |
| 10,287,642 | B2 | 5/2019 | Scott |
| 10,301,691 | B2 | 5/2019 | Feyisa et al. |
| 10,316,448 | B2 | 6/2019 | He et al. |
| 10,494,590 | B2 | 12/2019 | Abercrombie et al. |
| 2011/0296628 | A1 | 12/2011 | Jenkins et al. |
| 2012/0048299 | A1 | 3/2012 | Jenkins et al. |
| 2013/0167882 | A1 | 7/2013 | Burkinshaw et al. |
| 2014/0201929 | A1 | 7/2014 | He et al. |
| 2014/0317860 | A1 | 10/2014 | He et al. |
| 2015/0027173 | A1 | 1/2015 | Wu et al. |
| 2015/0096128 | A1 | 4/2015 | Sawford et al. |
| 2015/0152357 | A1 | 6/2015 | Abercrombie et al. |
| 2015/0175945 | A1 | 6/2015 | Waddon et al. |
| 2015/0252511 | A1 | 9/2015 | Roberts et al. |
| 2016/0040260 | A1 | 2/2016 | Steele |
| 2016/0195409 | A1 | 7/2016 | Goldberg et al. |
| 2016/0197998 | A1 | 7/2016 | Carleo |
| 2016/0251602 | A1 | 9/2016 | Steele et al. |
| 2016/0251603 | A1 | 9/2016 | Steele et al. |
| 2017/0051447 | A1 | 2/2017 | He et al. |
| 2017/0137983 | A1 | 5/2017 | He et al. |
| 2017/0159222 | A1 | 6/2017 | Jenkins et al. |
| 2017/0240980 | A1 | 8/2017 | Feyisa et al. |
| 2017/0240981 | A1 | 8/2017 | Scott |
| 2017/0240982 | A1 | 8/2017 | Sadeghi |
| 2017/0241061 | A1 | 8/2017 | Wells et al. |
| 2017/0247771 | A1 | 8/2017 | Scott |
| 2017/0267949 | A1 | 9/2017 | Bird et al. |
| 2018/0057777 | A1 | 3/2018 | Waddon et al. |
| 2018/0127914 | A1 | 5/2018 | Wells et al. |
| 2018/0134994 | A1 | 5/2018 | Steele et al. |
| 2018/0141089 | A1 | 5/2018 | Sawford et al. |
| 2018/0216049 | A1 | 8/2018 | Bird et al. |
| 2019/0210892 | A1* | 7/2019 | Scott .................. C02F 1/38 |
| 2019/0211288 | A1 | 7/2019 | Potts et al. |
| 2019/0233760 | A1 | 8/2019 | Lavery et al. |

FOREIGN PATENT DOCUMENTS

| | | |
|---|---|---|
| CN | 102425053 A | 4/2012 |
| CN | 102425055 A | 4/2012 |
| CN | 202214631 U | 5/2012 |
| CN | 202214633 U | 5/2012 |
| CN | 202298219 U | 7/2012 |
| CN | 202298220 U | 7/2012 |
| CN | 202298222 U | 7/2012 |
| CN | 202323458 U | 7/2012 |
| CN | 202359387 U | 8/2012 |
| CN | 202359388 U | 8/2012 |
| CN | 202359389 U | 8/2012 |
| CN | 202359390 U | 8/2012 |
| CN | 202359396 U | 8/2012 |
| CN | 202492706 U | 10/2012 |
| CN | 202543634 U | 11/2012 |
| CN | 202543635 U | 11/2012 |
| CN | 202543646 U | 11/2012 |
| CN | 202543652 U | 11/2012 |
| CN | 102899848 A | 1/2013 |
| CN | 202688698 U | 1/2013 |
| CN | 202755220 U | 2/2013 |
| CN | 202755221 U | 2/2013 |
| CN | 102953249 A | 3/2013 |
| CN | 102953250 A | 3/2013 |
| CN | 102953262 A | 3/2013 |
| CN | 102978870 A | 3/2013 |
| CN | 103061084 A | 4/2013 |
| CN | 103061085 A | 4/2013 |
| CN | 103061086 A | 4/2013 |
| CN | 103061087 A | 4/2013 |
| CN | 103087839 A | 5/2013 |
| CN | 103103720 A | 5/2013 |
| CN | 103103721 A | 5/2013 |
| CN | 103122566 A | 5/2013 |
| CN | 103122567 A | 5/2013 |
| CN | 202913242 U | 5/2013 |
| CN | 103225192 A | 7/2013 |
| CN | 203049283 U | 7/2013 |
| CN | 103361934 A | 10/2013 |
| CN | 103361938 A | 10/2013 |
| CN | 203370359 U | 1/2014 |
| CN | 102061588 B | 2/2014 |
| CN | 103556439 A | 2/2014 |
| CN | 203530695 U | 4/2014 |
| CN | 203530700 U | 4/2014 |
| CN | 203530714 U | 4/2014 |
| CN | 203530718 U | 4/2014 |
| CN | 203530723 U | 4/2014 |
| CN | 203530725 U | 4/2014 |
| CN | 103285643 B | 4/2015 |
| CN | 103451894 B | 11/2015 |
| CN | 103556434 B | 11/2015 |
| CN | 103556436 B | 11/2015 |
| CN | 103556431 B | 1/2016 |
| CN | 103556432 B | 3/2016 |
| CN | 105420992 A | 3/2016 |
| CN | 105420993 A | 3/2016 |
| CN | 105421000 A | 3/2016 |
| CN | 105442267 A | 3/2016 |

(56) References Cited

FOREIGN PATENT DOCUMENTS

| CN | 205329373 U | 6/2016 | | |
|---|---|---|---|---|
| CN | 205329374 U | 6/2016 | | |
| CN | 205329380 U | 6/2016 | | |
| CN | 205329384 U | 6/2016 | | |
| EP | 2503010 A1 | 9/2012 | | |
| EP | 2503010 A1 * | 9/2012 | ............ | C14C 15/00 |
| WO | WO-2011/098815 A1 | 8/2011 | | |
| WO | WO-2012/035342 A1 | 3/2012 | | |
| WO | WO-2012/056252 A2 | 5/2012 | | |
| WO | WO-2014/167358 A2 | 10/2014 | | |
| WO | WO-2016/046532 A1 | 3/2016 | | |

OTHER PUBLICATIONS

U.S. Appl. No. 16/093,433, filed Oct. 12, 2018, Xeros Ltd.
U.S. Appl. No. 16/318,192, filed Jan. 16, 2019, Xeros Ltd.
International Search Report for International Application No. PCT/GB2017/051051, dated Jul. 19, 2017 (4 pages).
Search Report for British Application No. GB1606404.0, dated Jun. 7, 2016 (2 pages).
U.S. Appl. No. 16/481,583, Xeros Ltd.
U.S. Appl. No. 16/497,070, Xeros Ltd.

* cited by examiner

ANIMAL SKIN SUBSTRATE TREATMENT METHOD AND APPARATUS

The present disclosure relates to methods and apparatus that employ a solid particulate material in the treatment of animal skin substrates. In particular, the present disclosure relates to methods and apparatus for improved recovery of clean solid particulate material following the treatment of animal skin substrates.

Standard methods for treating or processing animal skin substrates generally require large volumes of water. Such methods for treating or processing include, for example, removal of unwanted materials from the animal skin substrate and chemical modification of the animal skin substrate in order to preserve, colour or waterproof the substrate. For example, in treatment methods where the animal skin substrate comprises a hide, typically 30 kg of water is required per kg of hide. Consequently, carrying out animal skin substrate treatment processes requiring high water usage can be problematic, particularly in areas where water is scarce or access to water is restricted, and may have the effect of restricting the number of animal skin substrates that can be treated. Furthermore, the large volumes of water used in standard animal skin substrate treatment methods means that large amounts of chemicals are also required to provide suitable treatment formulations. This has a further disadvantage of producing proportionally large volumes of contaminated effluent that requires treatment or disposal, and which may cause pollution and have a negative environmental impact. Therefore, there has been a need to reduce the amount of water and chemicals required in animal skin substrate treatment methods.

The present applicant has previously addressed the problem of reducing water consumption in domestic and industrial cleaning methods, particularly for cleaning laundry. Thus, in WO2007/128962 there is disclosed a method and formulation for cleaning a soiled substrate, the method comprising the treatment of the moistened substrate with a formulation comprising a multiplicity of polymeric particles and optionally at least one cleaning material, wherein the formulation is free of organic solvents. In the disclosed embodiments, the substrate comprises a textile fibre.

The use of this cleaning method, however, presents a requirement for the polymeric particles to be efficiently separated from the cleaned substrate at the conclusion of the cleaning operation. This issue was addressed in WO2010/094959, which provides cleaning apparatus requiring the use of two internal drums capable of independent rotation. This issue was also addressed in WO2011/064581, which teaches an apparatus comprising a perforated drum and a removable outer drum skin which is adapted to prevent the ingress or egress of fluids and solid particulate matter from the interior of the drum. The cleaning method requires attachment of the outer skin to the drum during a first wash cycle, after which the skin is removed prior to operating a second wash cycle, following which the cleaned substrate is removed from the drum. In WO2011/098815, there is provided an apparatus for use in the cleaning of soiled substrates, the apparatus comprising housing means having a first upper chamber with a rotatably mounted cylindrical cage mounted therein and a second lower chamber located beneath the cylindrical cage, and additionally comprising at least one recirculation means, access means, pumping means and a multiplicity of delivery means, wherein the rotatably mounted cylindrical cage comprises a drum having perforated side walls where up to 60% of the surface area of the side walls comprises perforations comprising holes having a diameter of no greater than 25.0 mm.

The apparatus disclosed in WO2007/128962, WO2010/094959, WO2011/064581 and WO2011/098815 were principally concerned with the field of laundry where the substrate comprises textile fibres and garments. However, the apparatus and methods disclosed were not specifically adapted or optimised for the treatment of animal skin substrates.

The applicant has also disclosed processes for treating animal skin substrates using solid particulate material in patent applications published as WO-2014/167358-A, WO-2014/167359-A and WO-2014/167360-A. However, the present inventors have found that in the treatment of animal skin substrates with solid particulate material, a problem arises following recovery of solid particulate material from the animal skin substrate and from the treatment liquor, in that the solid particulate material is typically contaminated with solid waste fragments derived from said substrate and that these solid waste fragments are difficult to remove from the solid particulate material. The inventors have found that simply rinsing the recovered solid particulate material is not adequate and results in only partial removal of the solid waste fragments. This causes particular problems because the presence on the solid particulate material of solid waste fragments can lead to the introduction of undesirable contaminants or build-up of solid waste fragments in subsequent treatment processes when the solid particulate material is re-used.

Therefore, it is an object of the present disclosure to provide an apparatus and method of treating animal skin substrates having improved recovery of solid particulate material. In particular, it is an object of the present disclosure to provide an apparatus and method of treating animal skin substrates from which solid particulate material is recovered having reduced contamination by solid waste fragments derived from the substrate.

According to a first aspect of the present disclosure there is provided a method of treating an animal skin substrate comprising:
  agitating the animal skin substrate with a solid particulate material and a treatment liquor;
  separating the animal skin substrate from effluent comprising the solid particulate material, the treatment liquor and solid waste fragments derived from said substrate;
  transferring the effluent to a first separator, wherein the first separator is configured to allow the treatment liquor and at least a portion of the solid waste fragments to pass through the first separator but to prevent the solid particulate material from passing through the first separator, and providing a first filtrate stream comprising treatment liquor and solid waste fragments and a first residue comprising solid particulate material and residual solid waste fragments;
  treating said first residue to remove said residual solid waste fragments to provide cleaned solid particulate material,
  wherein said treating of said first residue comprises retaining said solid particulate material on a surface of a treatment separator during said treating, wherein the treatment separator is configured to allow liquid and residual solid waste fragments to pass through but to prevent the solid particulate material from passing through; and (i) directing a cleaning formulation onto said solid particulate material to provide a second filtrate stream comprising said cleaning formulation and said residual solid waste fragments and a second residue comprising cleaned solid particulate material; and/or (ii) agitating the treatment separator.

In this way, treating of the first residue is carried out while the residue is retained on a surface of the treatment separator, leading to improved removal of residual solid waste fragments derived from said substrate deposits. Agitation advantageously turns the particles during performance of the method, thereby exposing different parts of the particle surface to the separator surface and any cleaning formulation, which can result in a cleaner particle. Thus, cleaned solid particulate material may be recovered having reduced contamination by said solid waste fragments.

Retaining said solid particulate material on a surface of the treatment separator has an advantage of enabling interaction between the solid particulate material and the surface of the treatment separator, and thereby providing cleaner solid particulate material. Preferably, retaining said solid particulate material on a surface of the treatment separator during said treating comprises retaining said solid particulate material on the surface for a residence time (t). Typically, residence time (t) is at least about 5 seconds, at least about 8 seconds, at least about 10 seconds, or at least about 15 seconds. Increasing the residence time (t) of the solid particulate material on the treatment separator has an advantage of increasing the interaction between the solid particulate material and the surface of the treatment separator. Typically, the residence time (t) is no more than about 10 minutes, no more than about 5 minutes, no more than about 2 minutes, or no more than about 1 minute. Typically, the mass of solid particulate material on the surface of the separator is being continuously replenished with new solid particulate material flowing onto the separator and being continuously depleted by the removal of cleaned solid particulate from the separator (for instance via the access means disclosed herein) and so the term "residence time" preferably refers to the average residence time of a particle in a plurality of particles retained on the surface of the separator.

As used throughout the description in relation to all aspects disclosed herein, "animal skin substrate" includes skins, hides, pelts, leather and fleeces. Typically, the animal skin substrate is a hide or a pelt. The hide or pelt may be a processed or unprocessed animal skin substrate.

As used throughout the description in relation to all the aspects disclosed herein, the term "treating" in relation to treating an animal skin substrate is a tannery process, including colouring and tanning and associated tannery processes, preferably selected from curing, beamhouse treatments, pre-tanning, tanning, re-tanning, fat liquoring, enzyme treatment, tawing, crusting, dyeing and dye fixing, preferably wherein said beamhouse treatments are selected from soaking, liming, deliming, reliming, unhairing, fleshing, bating, degreasing, scudding, pickling and depickling. Preferably, said treating is a process used in the production of leather. Preferably, said treating acts to transfer a tanning agent (including a colourant or other agent used in a tannery process) onto or into the animal skin substrate.

The methods described herein relate to treating an animal skin substrate with a solid particulate material (which may also be referred to as a "multiplicity of solid particles"). The solid particulate material may be re-used one or more times in methods of treating according to the invention. Typically, the solid particulate material is re-used at least two, three, four, five or more times, such as 10, 20, 50 or 100 or more times in methods of treating animal skin substrates according to the invention. The solid particulate material is generally not re-used more than 10,000 times, preferably not more than 1000 times.

The solid particulate material recovered from one method of treating according to the invention may be re-used in a subsequent method of treating according to the invention, wherein said one method of treating and said subsequent method of treating are different methods each according to the invention. In which case, the substrate(s) subjected to said subsequent method of treating may be the same or different substrate(s) which were subjected to said one method of treating.

The solid particulate material may be re-used one or more times in treating the same substrate(s). Preferably, however, a method of treating according to the invention is a batch process in a sealed container and is preferably performed once per batch of substrate(s). As noted above, the solid particulate material may nevertheless be re-used one or more time in treating the same the substrate(s) in a different and subsequent method according to the invention.

The solid particulate material may be in the form of beads. The solid particulate material may comprise or may consist of a multiplicity of polymeric particles. The solid particulate material may comprise or may consist of a multiplicity of non-polymeric particles. The solid particulate material may comprise or may consist of a mixture of polymeric particles and non-polymeric particles.

The polymeric particles may comprise polyalkenes (such as polyethylene and polypropylene), polyamides, polyesters, polysiloxanes or polyurethanes. Of these, polyalkenes are preferred, especially polypropylene. Said polymers can be linear, branched or crosslinked. The polymeric particles may comprise polyamide or polyester particles, particularly particles of nylon, polyethylene terephthalate or polybutylene terephthalate, typically in the form of beads.

Various nylon homo- or co-polymers may be used including, but not limited to, Nylon 6 and Nylon 6,6. The nylon may comprise Nylon 6,6 copolymer having a molecular weight in the region of from about 5000 to about 30000 Daltons, such as from about 10000 to about 20000 Daltons, or such as from about 15000 to about 16000 Daltons. Useful polyesters may have a molecular weight corresponding to an intrinsic viscosity measurement in the range of from about 0.3 to about 1.5 dl/g, as measured by a solution technique such as ASTM D-4603.

The polymeric particles can comprise foamed polymers or unfoamed polymers.

The polymeric particles may comprise fillers, such as mineral fillers (for instance, barium sulphate).

Optionally, copolymers of the above polymeric materials may be employed. Specifically, the properties of the polymeric materials can be tailored to specific requirements by the inclusion of monomeric units which confer particular properties on the copolymer.

The non-polymeric particles may comprise particles of glass, silica, stone, metal, or ceramic materials. Suitable metals include, but are not limited to, zinc, titanium, chromium, manganese, iron, cobalt, nickel, copper, tungsten, aluminium and tin, and alloys thereof. Suitable ceramics include, but are not limited to, alumina, zirconia, tungsten carbide, silicon carbide and silicon nitride.

The polymeric or non-polymeric particles can be chemically modified to include one or more moieties selected from the group consisting of: enzymes, oxidizing agents, catalysts, metals, reducing agents, chemical cross-linking agents and biocides.

The polymeric particles or non-polymeric particles may be of such a shape and size as to allow for good flowability and intimate contact with the animal skin substrate. A variety of shapes of particles may be used, such as cylindrical, ellipsoidal, spheroidal, spherical or cuboid, or shapes therebetween. Appropriate cross-sectional shapes may be employed including, for example, annular ring, dog-bone and circular. Non-polymeric particles comprising naturally occurring materials such as stone may have various shapes, dependent on the way they cleave during manufacture. Preferably, the polymeric particles and the non-polymeric particles comprise generally ellipsoidal or spherical beads. Spherical and ellipsoidal shaped particles are particularly preferred as they provide good mechanical action on the substrate; are generally easier to separate from the substrate; and because particles having these shapes can be more readily cleaned (it has been found that solid waste fragments are more readily separated from such shapes).

The polymeric particles or non-polymeric particles may have smooth or irregular surface structures and may be of solid, porous or hollow structure or construction. Smooth surfaces which are substantially free from holes, pores, projections and other imperfections are preferred because such particles are more readily cleaned.

The particles of the solid particulate material may have an average mass of from about 1 mg to about 3000 mg, or from about 1 mg to about 1000 mg, or from about 1 mg to about 700 mg, or from about 1 mg to about 500 mg, or from about 1 mg to about 300 mg, or from about 1 mg to about 150 mg, or from about 1 mg to about 70 mg, or from about 1 mg to about 50 mg, or from about 1 mg to about 35 mg, or from about 10 mg to about 30 mg, or from about 12 mg to about 25 mg. Alternatively, the particles may have an average mass of from about 10 mg to about 800 mg, or from about 50 mg to about 700 mg, or from about 70 mg to about 600 mg.

The particles of the solid particulate material preferably exhibit a surface area of from about 10 $mm^2$ to about 1000 $mm^2$, or from about 10 $mm^2$ to about 200 $mm^2$, or from about 10 $mm^2$ to about 120 $mm^2$. In a preferred embodiment, the particles have a surface area of from about 15 $mm^2$ to about 60 $mm^2$, or from about 20 $mm^2$ to about 40 $mm^2$. In a further preferred embodiment, the particles have a surface area from about 35 $mm^2$ to about 70 $mm^2$.

The particles of the solid particulate material preferably exhibit an average density in the range of from about 0.5 $g/cm^3$ to about 8.0 $g/cm^3$, from about 0.6 $g/cm^3$ to about 5.0 $g/cm^3$, from about 1.0 $g/cm^3$ to about 3.5 $g/cm^3$, from about 1.1 $g/cm^3$ to about 3.0 $g/cm^3$, from about 1.2 $g/cm^3$ to about 2.5 $g/cm^3$, from about 1.3 $g/cm^3$ to about 2.0 $g/cm^3$, from about 1.4 $g/cm^3$ to about 1.9 $g/cm^3$, or from about 1.5 $g/cm^3$ to about 1.8 $g/cm^3$. In a further preferred embodiment, the average density is in the range of from about 1.1 to about 3.0 $g/cm^3$, preferably from about 1.5 to about 2.5 $g/cm^3$.

The non-polymeric particles preferably exhibit an average density in the range of from about 0.5 $g/cm^3$ to about 20 $g/cm^3$, from about 2 $g/cm^3$ to about 20 $g/cm^3$, from about 4 $g/cm^3$ to about 15 $g/cm^3$, from about 4 $g/cm^3$ to 10 $g/cm^3$, from about 3.5 $g/cm^3$ to about 12.0 $g/cm^3$, from about 5.0 $g/cm^3$ to about 10.0 $g/cm^3$ or from about 6.0 $g/cm^3$ to about 9.0 $g/cm^3$. The non-polymeric particles may have an average density greater than the polymeric particles.

The average volume of the polymeric and non-polymeric particles is preferably in the range of from about 5 to about 500 $mm^3$, from about 5 to about 275 $mm^3$, from about 8 to about 140 $mm^3$, or from about 10 to about 120 $mm^3$.

The particles of the solid particulate material preferably have an average particle diameter of from about from about 1 mm to about 200 mm, 1 mm to about 100 mm, from about 1 mm to about 50 mm, from about 1 mm to about 25 mm, from about 1 mm to about 10 mm, from about 2 mm to about 8 mm, from about 3 mm to about 7 mm or from about 4 mm to about 6 mm. The effective average diameter can also be calculated from the average volume of a particle by simply assuming the particle is a sphere. The average is preferably a number average. The average is preferably performed on at least about 10, more preferably at least about 100 particles and especially at least about 1000 particles.

The particles of the solid particulate material preferably have a length of from about 1 mm to about 200 mm, from about 1 mm to about 100 mm, from about 1 mm to about 50 mm, from about 1 mm to about 25 mm, from about 1 mm to about 15 mm, from about 1 mm to about 10 mm, from about 2 mm to about 8 mm, from about 3 mm to about 7 mm, from about 4 mm to about 6 mm, or from about 4.5 mm to about 5 mm. The length can be defined as the maximum two-dimensional length of each three-dimensional solid particle. Preferably, the length is measured using Vernier calipers. The average is preferably a number average. The average is preferably performed on at least about 10, more preferably at least about 100 particles and especially at least about 1000 particles.

The particles may be generally spherical in shape (but not necessarily a perfect sphere) having a particle diameter, $d_s$, in the region of from about 1.0 to about 15.0 mm, from about 2.0 to about 8.0 mm or from about 4.0 mm to about 8.0 mm.

The particles may be perfectly spherical in shape having a particle diameter, $d_{ps}$, in the region of from about 1.0 to about 15.0 mm, of from about 2.0 to about 8.0 mm, or from about 4.0 mm to about 8.0 mm.

As used throughout the description in relation to all the aspects disclosed herein, the term "treatment liquor" is a liquid used in the treating of the animal skin substrate. Preferably, the treatment liquor is an aqueous liquor. Thus, the treatment liquor preferably comprises water and preferably a major fraction of the treatment liquor is water. The treatment liquor can comprise at least about 0.1% w/w water, or at least about 1% w/w water, or at least about 5% w/w water, or from about 5% to about 99.9% w/w water. Minor amounts of organic solvents, preferably less than about 10% w/w, more preferably less than about 5% w/w, can be present in the treatment liquor but preferably organic solvents are absent from the treatment liquor. Alternatively, the treatment liquor is substantially free from water except for water originating from the animal skin substrate.

The treatment liquor preferably comprises at least one treatment agent. Typical treatment agents include tanning agents, re-tanning agents, tannery process agents and colorants.

The tanning agent and/or tannery processing agents can be selected to chemically modify the animal substrate, such as by linking and locking collagen protein strands of the animal substrate together.

The tannery process agent can comprise a chemical used in the treatment of an animal substrate in one or more tannery processes, wherein the tannery processes may be as described hereinabove.

The tanning or retanning agent can be a synthetic tanning agent, vegetable tanning agent or mineral tanning agent, such as chromium III salts. Where the treatment liquor comprises chromium III salts, typically the chromium III salt is present in an amount of from 8% w/w or less, from 6% w/w or less, from 5% w/w or less, or preferably from 4.5% w/w or less based on the mass of the animal substrate.

Where the treatment liquor comprises a colorant, the colorant is typically selected from one or more dyes, pigments, optical brighteners or mixtures thereof.

The method of the present invention is preferably a batch process, preferably a batch process in a treatment chamber, preferably a sealed treatment chamber, preferably wherein the treatment chamber is a rotatably mounted drum as described hereinbelow.

As used throughout the description in relation to all the aspects disclosed herein, the term "agitating" in relation to agitating the animal skin substrate with a solid particulate material and a treatment liquor, comprises providing relative movement between the animal skin substrate and the solid particulate material and treatment liquor. Typically, agitation of the animal skin substrate with a solid particulate material and a treatment liquor is effected by moving, shaking or rotating the animal skin substrate, solid particulate material and treatment liquor in a treatment chamber. Preferably, the treatment chamber is a drum. Preferably, the drum is a rotatably mounted drum.

Preferably, the treatment chamber is rotated at a speed of from about 1 to about 50 rpm, from about 1 to about 30 rpm, or from about 1 to about 15 rpm.

Where the treating of the animal skin substrate is a beamhouse process or a tanning, retanning, fat-liquoring or a dyeing process, the treatment chamber is generally rotated at a speed of from about 3 to about 14 rpm, from about 5 to about 13 rpm, or from about 8 to about 12 rpm. The treatment chamber may be rotated at a speed of not more than 15 rpm, of not more than 13 rpm, of not more than 12 rpm, of not more than 10 rpm, of not more than 8 rpm, of not more than 6 rpm, of not more than 5 rpm, of not more than 4 rpm, of not more than 3 rpm or not more than 1 rpm. Lower rotational speeds may advantageously produce fewer solid waste fragments.

Typically, the treatment chamber has an opening having a closure moveable between a closed position at which the closure prevents the contents of the treatment chamber (such as the animal skin substrate, the solid particulate material, the treatment liquor and solid waste fragments derived from the substrate) from passing through the opening and an open position at which the contents of the treatment chamber can pass through the opening. During agitation of the drum, the closure is normally in the closed position.

The treatment chamber may be of a size commonly found in treatment chambers in animal skin substrate processing plants, such as in tanneries. Typically, the treatment chamber has a capacity of from about 500 to about 200,000 litres. The treatment chamber can have an ullage volume of at least 10% by volume, preferably, at least 20% by volume and more preferably from 30 to 60% or 30 to 70% by volume. These ullage volumes can be effective in order to provide for efficient mixing while maximising the utlilisation capacity of the treatment chamber.

In the methods of treating an animal skin substrate disclosed herein, the treated animal skin substrate is separated from effluent comprising solid waste fragments derived from the substrate, solid particulate material and treatment liquor. The separation step may be effected at least in part by the apparatus in which the method is carried out. Alternatively, the separation step may be effected by an operator, or by a combination of the features of the apparatus and the intervention of an operator.

For example, the apparatus may be configured to retain the animal skin substrate in the treatment chamber while allowing the effluent to drain out, fall out or be pumped out. Alternatively, following agitation of the animal skin substrate with the solid particulate material and the treatment liquor in a treatment chamber, an operator may access the treatment chamber via an opening and remove the animal skin substrate, leaving the effluent in the treatment chamber.

Alternatively, the animal substrate and the effluent may be allowed to fall out of the treatment chamber under gravity or may be tipped out into a container from which an operator may remove the animal skin substrate. Preferably, the container comprises a grating that assists in separation of the animal skin substrate from the effluent by preventing the animal skin substrate from passing through but allowing the effluent to pass through. In this way, the animal skin substrate can be removed from the grating of the container once the effluent has drained through the grating.

Where the separating step comprises the intervention of an operator, separation of the animal substrate may be done manually or using a mechanical tipping or lifting device, such as a winch or forklift.

As used throughout the description in relation to all the aspects disclosed herein, the term "solid waste fragments derived from the substrate" refers to material which has been separated from the substrate during the method of treating the substrate with a solid particulate material and a treatment liquor. The term "solid" includes fibrous and particulate matter, which may be in the form of a gel. The solid waste fragments are typically suspended in the treatment liquor.

Preferably, the solid waste fragments derived from the substrate are fibrous and/or particulate.

Where the substrate is an animal skin substrate, such as a hide or pelt, typically at least a portion of the solid waste fragments is collagen and/or derivative(s) thereof. Preferably, a major portion of the solid waste solid waste fragments is collagen and/or derivative(s) thereof, typically wherein said collagen and/or derivative(s) thereof constitute at least about 60 wt %, preferably at least about 70 wt %, preferably at least about 80 wt %, preferably at least about 90 wt %, preferably at least about 95 wt % by total weight of the solid waste fragments. Where one or more collagen derivative(s) are present, said collagen derivative(s) are typically present as a minor fraction of the total amount of collagen and collagen derivative(s) present in the solid waste fragments, and collagen is present as a major fraction of the total amount of collagen and collagen derivative(s) present in the solid waste fragments. As used herein, a "derivative" of collagen is a compound produced from collagen by a chemical reaction, and includes a decomposition product thereof. Such a derivative may be produced as a result of the method of treating the substrate with a solid particulate material and a treatment liquor, but alternatively or additionally may have been produced prior to such treatment, for instance as a result of the processing and/or storage conditions experienced by the animal skin substrate before or after (typically after) its removal from the animal. A derivative which is produced as a result of the method of treating the substrate with a solid particulate material and a treatment liquor is typically produced during said treating method.

The effluent may be transferred to the first separator by a feeding mechanism. The feeding mechanism may comprise pumping means, such as a pump suitable for transferring a mixture of liquid and solids; a vibratory feeder; a mechanical conveyer, such as a disc-driven system (such as a disc belt), an Archimedean screw, or a conveyor belt; or pneumatic or vacuum conveying means.

Alternatively, the effluent may be transferred to the first separator by collecting the effluent in a container and tipping the effluent out onto the first separator. For example, the effluent may be tipped out of the container by hand, by using a mechanical device, such as a tipping skip, winch or forklift.

Preferably, said transferring the effluent to said first separator comprises pumping or vacuum conveying.

Preferably, in said transferring of the effluent to said first separator, the rate of transfer to the first separator is controlled by a second flow regulator. In this way, the movement of the effluent to the first separator can be controlled, which can reduce clogging of the first separator by the solid particulate material. Typically, the second flow regulator may be a valve, a rotary valve, or a narrowing in a portion of a flow pathway leading to the first separator.

The inclusion of the second flow regulator, particularly a rotary valve, is particularly preferred where the effluent is transferred to the treatment separator by vacuum conveying.

Said first filtrate stream may be recycled directly to the effluent, but is preferably further treated by separating solid waste fragments from the treatment liquor, the treatment liquor preferably then being recycled or re-used in the method. Some or substantially all of a first filtrate stream may optionally combine or be combined with some of substantially all of a second filtrate stream prior to said further treatment to separate solid waste fragments from the treatment liquor.

Recycling of the first filtrate stream and, optionally, the second filtrate stream may lead to a reduction in the amount of water used in the methods described herein.

In arrangements comprising a container in which effluent is collected prior to transferring the effluent to the first separator, preferably some or substantially all of said first filtrate stream may be recycled directly to the container. Preferably said first filtrate stream is further treated by separating solid waste fragments from the treatment liquor prior to recycling to the container. Recycling of the first filtrate stream to the container can assist in improving efficiency of removal of the effluent from the container, particularly removal of solid particulate material comprised in the effluent.

Some or substantially all of the first filtrate stream may optionally combine or be combined with some or substantially all of a second filtrate stream prior to recycling to the container. Preferably, said combined first and second filtrate stream may be further treated by separating solid waste fragments from the treatment liquor prior to recycling to the container.

The first separator preferably comprises a plurality of apertures. The first separator may comprise a web, mesh or grill. Alternatively, the first separator may comprise a sheet having a plurality of apertures formed therein, that is, wherein the apertures are created in an existing sheet (referred to herein as post-formed apertures, and wherein the sheet having the post-formed apertures is referred to herein as being "perforated"). Preferably, the first separator comprises a planar surface having apertures. Preferably, the first separator is a perforated sheet.

The apertures of the web or mesh or grill and the apertures formed in an existing sheet are sized so as to permit the passage of treatment liquor and at least a portion of the solid waste fragments derived from said substrate whilst preventing the passage of the solid particulate material. The size of the apertures in the first separator depends on the size of the particles of the solid particulate material used in the method of treating the animal skin substrate. As such, the apertures of the first separator are required to be smaller than the smallest dimension of the solid particulate material.

The apertures of the first separator may be any suitable shape, such as slots, circles, ovals, ellipses or hexagons. Preferably the first separator comprises apertures that have a smooth perimeter, such as circles, ovals or ellipses. An advantage of having shapes without vertices, such as circles, ovals and ellipses, is that fouling of the first separator by the solid waste fragments (which may be referred to as formation of solid waste fragment stalactites) may be reduced or prevented.

The first separator may be made from or comprise a metal (including an alloy), a polymer (including a polymeric composite (such as a glass fibre reinforced polymer)) or a ceramic. Preferably, the first separator is made from metal, more preferably stainless steel.

The first separator may be woven (such as a mesh formed from an interlaced network of wire or thread) or a sheet or plate with apertures formed therein (i.e. non-woven). Preferably, the first separator is non-woven.

Preferably, the first separator is planar, for example, the first separator may comprise a plate with apertures formed therein. Preferably, the first separator comprises or consists of a non-woven mesh, such as an apertured flat plate. Preferably, the first separator comprises or consists of an apertured metal plate. Having a metal plate with apertures formed therein generally reduces trapping of solid waste fragments compared with woven or mesh structures and allows for easier cleaning. Metal plates with apertures formed therein also suffer less from deformation and therefore require replacing less frequently.

In particular, the use of a metal plate having oval or ellipse apertures formed therein as the first separator leads to high levels of solid particulate material separation and reduces the fouling of the separator by the solid waste fragments. Furthermore, the use of a metal plate is advantageous as it is durable and better able to withstand cleaning, in particular solid waste fragment removal, without distorting aperture size or shape.

Alternatively, the first separator may be comprised as part of a moving conveying mechanism. For example, the first separator may comprise or consist of an apertured continuous belt that is able to move.

The total open area of the first separator (wherein the total open area is the total surface area of the apertures as a percentage of the total surface area of the first separator) is typically at least about 5%, at least about 10%, at least about 15%, at least about 20%, at least about 30%, at least about 40%, at least about 45%, at least about 50%, at least about 55%, or at least about 60%. The total open area of the first separator is preferably no more than about 99%, no more than about 90%, no more than about 80%, no more than about 75%, no more than about 70%, no more than about 65%. Preferably, the total open area is from about 15% to about 70%, preferably from about 20% to about 65%.

An example of a particularly preferred first separator comprises a multiplicity of wedge-shaped rods or wires positioned together to form a grill. In this arrangement, the apertures in the first separator are comprised of the gaps between the wedge-shaped rods or wires and are linear apertures. Preferably, the wedge-shaped rods or wires are arranged to form a grill in such a way as to present an essentially planar surface on the side of the grill on which the effluent strikes the first separator. Preferably, the wedge-shaped rods or wires are arranged so that they are substantially parallel.

As used throughout the description in relation to all the aspects disclosed herein by "cleaned solid particulate material" is meant that the solid particulate material has substantially no visible solid waste fragments associated with it. By "visible solid waste fragments" is meant solid waste fragments that can be observed by the naked eye at a distance of about 10 cm. Typically, cleaned solid particulate material has 10% or fewer particles by total number of particles in the solid particulate material with visible solid waste fragments, preferably about 5% or fewer particles, about 3% or fewer particles, about 2% or fewer particles, about 1% or fewer particles, or about 0.5% or fewer particles.

Preferably, said treating of the first residue comprises or consists of (i) directing a cleaning formulation onto said solid particulate material while it is retained on a surface of the treatment separator to provide a second filtrate stream comprising said cleaning formulation and said residual animal skin substrate and a second residue comprising cleaned solid particulate material.

Preferably, said treating of the first residue comprises or consists of (ii) agitating said treatment separator. Typically, agitating said treatment separator comprises vibrating the treatment separator or moving the treatment separator, such as rotating the treatment separator or subjecting the treatment separator to a reciprocating motion or linear motion in a single direction. Agitating said treatment separator in this way provides relative movement between the treatment separator and the first residue retained on the surface of the treatment separator.

Preferably, said treating of said first residue comprises or consists of (i) directing a cleaning formulation onto said solid particulate material to provide a second filtrate stream comprising said cleaning formulation and said residual animal skin substrate and a second residue comprising cleaned solid particulate material, and (ii) agitating the treatment separator, wherein the directing step (i) and the agitating step (ii) are conducted simultaneously or sequentially. Where the directing step (i) and the agitating step (ii) are conducted sequentially, they may be conducted in any order. The directing step (i) and the agitating step (ii) may each be conducted once during the treating of said first residue. Alternatively, the directing step (i) and the agitating step (ii) may be performed multiple times during the treating of said first residue, optionally cyclically. The directing step (i) and the agitating step (ii) may be conducted partially simultaneously such that there is an overlap, for example, the agitating step (ii) may start after the commencement but before completion of the directing step (i).

Preferably, the agitating step (ii) comprises vibration of the treatment separator, as described herein. The vibrational movement referred to herein preferably provides at least a component of movement in the vertical plane, more preferably the movement provided is in the vertical and horizontal planes.

The treatment separator preferably comprises a plurality of apertures. The treatment separator may comprise a web, mesh or grill. Alternatively, the treatment separator may comprise a substrate having a plurality of apertures formed therein, that is, wherein the apertures are created in an existing substrate (referred to herein as post-formed apertures, and wherein the substrate having the post-formed apertures is referred to herein as being "perforated"). Preferably, the treatment separator comprises a planar surface having apertures. Preferably, the treatment separator is a perforated sheet.

The apertures of the web or mesh or grill and the apertures formed in a substrate are sized so as to permit the passage of treatment liquor and at least a portion of the solid waste fragments derived from said substrate whilst preventing the passage of the solid particulate material. The size of the apertures in the treatment separator depends on the size of the particles in the solid particulate material that are being used in the method of treating the animal skin substrate. As such, the apertures of the treatment separator are required to be smaller than the smallest dimension of the solid particulate material.

The apertures of the treatment separator may be any suitable shape, such as slots, circles, ovals, ellipses or hexagons. Preferably the treatment separator comprises apertures that have a smooth perimeter, such as circles, ovals or ellipses. An advantage of having shapes without vertices, such as circles, ovals and ellipses, is that fouling of the treatment separator by the solid waste fragments (which may be referred to as formation of solid waste fragment stalactites) may be reduced or prevented.

The total open area of the treatment separator (wherein the total open area is the total surface area of the apertures as a percentage of the total surface area of the treatment separator) is typically at least about 40%, at least about 45%, at least about 50%, at least about 55%, preferably at least about 60%. The total open area of the treatment separator is no more than about 99%, no more than about 90%, no more than about 80%, no more than about 75%, no more than about 70%, no more than about 65%. Preferably, the total open area is from about 45% to about 70%, preferably from about 60% to about 65%.

An example of a preferred treatment separator comprises a multiplicity of wedge-shaped rods or wires positioned together to form a grill. In this arrangement, the apertures in the treatment separator are comprised of the gaps between the wedge-shaped rods or wires and are linear apertures.

Preferably, the wedge-shaped rods or wires are arranged to form a grill in such a way as to present an essentially planar surface on one side of the grill. Preferably, the wedge-shaped rods or wires are arranged so that they are substantially parallel.

The treatment separator may be made from or comprise a metal (including an alloy), a polymer (including a polymeric composite (such as a glass fibre reinforced polymer)) or a ceramic. Preferably, the treatment separator comprises metal, more preferably stainless steel.

The treatment separator may be woven (such as a mesh formed from an interlaced network of wire or thread) or a substrate or plate with apertures formed therein (i.e. non-woven). Preferably, the treatment separator is non-woven.

Preferably, the treatment separator is planar, for example, the treatment separator may comprise a plate with apertures formed therein. Preferably, the treatment separator comprises or consists of a non-woven mesh, such as an apertured flat plate. Preferably, the treatment separator comprises or consists of an apertured metal plate. Having a metal plate with apertures formed therein generally reduces trapping of solid waste fragments compared with woven or mesh structures and allows for easier cleaning. Metal plates with apertures formed therein also suffer less from deformation and therefore require replacing less frequently.

In particular, the use of a metal plate having oval or elliptical apertures formed therein as the treatment separator leads to high levels of solid particulate material separation and reduces the fouling of the separator by the solid waste fragments. Furthermore, the use of a metal plate is advantageous as it is durable and better able to withstand cleaning, in particular solid waste fragment removal, without distorting aperture size or shape.

Alternatively, the treatment separator may be comprised as part of a moving conveying mechanism. For example, the treatment separator may comprise or consist of an apertured continuous belt that is able to move.

The cleaning formulation that is directed onto the solid particulate material may comprise or consist of water. Thus, preferably, the cleaning formulation is an aqueous cleaning formulation. The cleaning formulation preferably comprises water and preferably a major fraction of the liquid cleaning formulation is water. The cleaning formulation may comprise a cleaning agent, such as a detergent composition. The cleaning formulation may comprise or consist of water and at least one cleaning agent. Alternatively, the cleaning formulation consists of water. Preferably, the cleaning formulation does not comprise any solid material, including any suspended solids. More than one type of cleaning formulation may be used. Thus, in one preferred embodiment, a first cleaning formulation which comprises or consists of water and at least one cleaning agent is directed onto the solid particulate material, followed by a second cleaning formulation which consists of water, or which comprises or consists of water and at least one cleaning agent which is different from said at least one cleaning agent in the first cleaning formulation. In another preferred embodiment, a first cleaning formulation is or comprises a filtrate stream (as described herein) and a second cleaning formulation comprises or consists of water, optionally with at least one cleaning agent.

The detergent composition may comprise cleaning components such as surfactants, enzymes and bleach. Oxidative compounds and buffers may also be used.

Examples of suitable surfactants that can be included in the detergent composition can be selected from non-ionic and/or anionic and/or cationic surfactants and/or ampholytic (including zwitterionic) surfactants. The surfactant can typically be present at a level of from about 0.1%, from about 1%, or even from about 5% by weight of the detergent composition to about 99.9%, to about 80%, to about 35%, or even to about 30% by weight of the detergent composition.

The detergent composition may include one or more detergent enzymes which provide cleaning performance benefits. Examples of suitable enzymes include, but are not limited to, hemicellulases, peroxidases, proteases, other cellulases, other xylanases, lipases, phospholipases, esterases, cutinases, pectinases, collagenases, keratinases, reductases, oxidases, phenoloxidases, lipoxygenases, ligninases, pullulanases, tannases, pentosanases, malanases, [beta]-glucanases, arabinosidases, hyaluronidase, chondroitinase, laccase, and amylases, or mixtures thereof. Preferably, the detergent composition comprises at least a protease, for instance a collagenase. The enzyme is preferably present at a level of from about 0.01% to about 10%, more preferably from about 0.01% to about 5% by weight of the cleaning composition.

Optionally, enzyme stabilisers may also be included in the detergent composition. In this regard, enzymes for use in detergents may be stabilised by various techniques, for example by the incorporation of water-soluble sources of calcium and/or magnesium ions in the compositions.

The detergent composition may include one or more bleach compounds and optionally associated catalysts and/or activators. Examples of such bleach compounds include, but are not limited to, peroxygen compounds, including hydrogen peroxide, inorganic peroxy salts, such as perborate, percarbonate, perphosphate, persilicate, and mono persulphate salts (e.g. sodium perborate tetrahydrate and sodium percarbonate), and organic peroxy acids such as peracetic acid, monoperoxyphthalic acid, diperoxydodecanedioic acid, N,N'-terephthaloyl-di(6-aminoperoxycaproic acid), N,N'-phthaloylaminoperoxycaproic acid and amidoperoxyacid. Bleach activators include, but are not limited to, carboxylic acid esters such as tetraacetylethylenediamine and sodium nonanoyloxybenzene sulphonate.

Typically, the cleaning formulation is directed onto the solid particulate material on the treatment separator via one or more spraying means, such as one or more hoses or one or more nozzles. Preferably, directing the cleaning formulation onto the solid particulate material comprises pumping, typically at a pressure of from about $2\times10^5$ Pa to about $10^6$ Pa.

The composition of the cleaning formulation may depend on the nature of the solid waste fragments present on the solid particulate material. As such, the composition of the cleaning formulation may depend on the type of animal skin substrate that the solid particulate material has treated. For example, a cleaning formulation consisting of water may be used to treat the first residue when certain animal skin substrates are treated, whereas for other animal skin substrates a cleaning formulation comprising water and a detergent composition may be required.

Preferably, the method further comprises passing the second filtrate stream through a first fine grading separator to remove residual solid waste fragments to provide a cleaning formulation filtrate stream. The first fine grading separator may be as defined above in respect of the first separator but has apertures sized to allow liquid, such as cleaning formulation and treatment liquor, to pass through but prevents substantially all solid waste fragments from passing through, i.e. including said residual solid waste fragments. Preferably, the first fine grading separator removes at least about 80 wt %, at least about 85 wt %, at least about 90 wt %, at least about 95 wt %, at least about 98 wt %, at least about 99 wt %, or at least about 99.5 wt % of the solid waste fragments present in the second filtrate stream.

In a further preferred embodiment, the method may further comprise passing the second filtrate stream through a filtration apparatus which is or comprises a self-cleaning filter to provide said cleaning formulation filtrate stream. Self-cleaning filters generally operate by the mechanical and periodic removal of residue from the filter. In some self-cleaning filters, the residue may be periodically drained from the filtration apparatus via a valve or other means. A self-cleaning filter may operate under elevated pressure, and suitable means for pressuring the second filtrate stream can readily be connected to the filtration apparatus. A preferred self-cleaning filter comprises a rotatable helical cleaning element (preferably horizontally disposed) which scrapes the filter surface clean when rotated. An example of a self-cleaning filter is described in EP-0884079-A, for instance.

Preferably, the method comprises recycling said cleaning formulation filtrate stream to further treat said first residue.

Alternatively, some or substantially all of said second filtrate stream may be recycled directly to further treat said first residue without passing through a first fine grading separator.

Preferably, the method comprises transferring the effluent to the first separator via a coarse grading separator, wherein said coarse grading separator is configured to allow said solid particulate material to pass through said coarse grading separator but to prevent material of a size substantially larger than said solid particulate material from passing through. The coarse grading separator may be as defined above in respect of the first separator but with larger apertures, that is, having apertures which allow the solid particulate material to pass through. Typically, the smallest dimension of the apertures of the coarse grading separator are at least about 10% larger, at least about 15% larger, at least about 20% larger, at least about 25% larger, preferably at least about 50% larger, preferably at least about 100% larger, or preferably at least about 150% larger than the largest dimension of the particles in the solid particulate material.

Typically, the material of a size substantially larger than said solid particulate material comprises solid waste fragments derived from the animal skin substrate. In this way, pieces of animal skin substrate that have become detached from the animal skin substrate during the method of treating or any other large objects, such as tools, that have entered the effluent can be captured and removed from the effluent prior to recovery and cleaning of the solid particulate material.

Preferably, the treatment separator is comprised in a multilayer separating treatment apparatus comprising a first fine grading separator,
- wherein said first fine grading separator allows liquid to pass through but prevents solid waste fragments from passing through, and
- wherein the multilayer separating treatment apparatus is configured so that any material to be separated is exposed to the treatment separator before it is exposed to the fine grading separator.

Preferably, the treatment separator is comprised in a multilayer separating treatment apparatus comprising a coarse grading separator and a first fine grading separator,
- wherein said coarse grading separator is configured to allow said solid particulate material to pass through but to prevent material of a size substantially larger than said solid particulate material from passing through,
- wherein said first fine grading separator allows liquid to pass through but prevents solid waste fragments from passing through, and
- wherein the multilayer separating treatment apparatus is configured so that any material to be separated is exposed to the coarse grading separator before the treatment separator and is exposed to the treatment separator before the fine grading separator.

An advantage of the multilayer separating treatment apparatus is that it integrates the treatment separator and the fine grading separator, and optionally the coarse grading separator, into a single component. Preferably, the treatment separator and the fine grading separator, and optionally the coarse grading separator, are stacked such that the treatment separator is positioned above the fine grading separator and, where present, the coarse grading separator is positioned above the treatment separator. Preferably, the treatment separator is positioned above and substantially directly aligned with the fine grading separator and, where present, the coarse grading separator is positioned above and substantially directly aligned with the treatment separator.

Preferably, the treatment separator moves during performance of the method. Preferably, the treatment separator is subjected to rotation or a reciprocating motion or a linear motion in a single direction during performance of the method. Preferably, said multilayer separating treatment apparatus comprises a moving mechanism for moving the treatment separator during performance of the method. Preferably, the multilayer separating treatment apparatus is a moving separator, more preferably a moving self-cleaning separator.

Preferably, the treatment separator vibrates during performance of the method. Preferably, said multilayer separating treatment apparatus comprises a vibratory mechanism. Preferably, the multilayer separator is a vibratory separator.

Typically, the coarse grading separator and/or the treatment separator and/or the fine grading separator, particularly in the multilayer separating treatment apparatus, are substantially circular or substantially elliptical, and preferably substantially circular. Preferably, the coarse grading separator, the treatment separator and the fine grading separator, particularly in a multilayer separating treatment apparatus, have substantially the same shape.

Preferably, at least the treatment separator (particularly when the treatment separator is a vibratory separator) is substantially circular, whether or not the secondary separator is present in a multilayer separating apparatus. An advantage of having a substantially circular treatment separator that vibrates is that solid particulate material that is retained on the treatment separator typically moves across the treatment separator, for example in a spiral path, which increases the residence time (t) of the solid particulate material on the treatment separator. Increasing the residence time (t) of the solid particulate material on the treatment separator has an effect of increasing the interaction between the solid particulate material and the surface of the treatment separator. In this way, cleaner solid particulate material can be provided.

Preferably, the multilayer separator treatment apparatus comprises an access means associated with each layer of the multilayer separator treatment apparatus in order to remove material that is unable to pass through each separator layer. In this way, for example, solid particulate material can be removed from the multilayer separator treatment apparatus via an access means associated with the treatment separator, and solid waste fragments smaller than the solid particulate material may be removed from the multilayer separator treatment apparatus via an access means associated with the fine grading separator. Typically, the access means is a port, a valve, a tap or an opening having a closure.

Where the treatment separator is comprised in a vibratory separator, preferably the treatment separator is positioned above and is substantially directly aligned with the fine grading separator, and at least one large solid particle, such as a solid ball, having a diameter of from about 2 cm to about 6 cm is positioned between the coarse grading separator and the treatment separator. Preferably, the at least one large solid particle is a rubber ball. The presence of such large solid particles assists in reduction of fouling of the treatment separator by solid waste fragments.

In a preferred embodiment, the treatment separator is the first separator and any reference herein to "the first separator" is interchangeable with the "treatment separator". In this way, the method of treating the animal skin substrate comprises a process for recovery and cleaning of the solid particulate material in which a single separator is used for the first separator and the treatment separator.

Where the treatment separator is the first separator, the second filtrate stream may combine with the first filtrate stream. As such, the second filtrate stream may comprise treatment liquor, cleaning formulation and solid waste fragments derived from the animal skin substrate. Thus, where the method comprises passing the second filtrate stream through a first fine grading separator to remove residual solid waste fragments to provide a cleaning formulation filtrate stream, the cleaning formulation stream may comprise filtered cleaning formulation and filtered treatment liquor. Where the cleaning formulation filtrate stream comprises filtered cleaning formulation and filtered treatment liquor, it may also be recycled to further treat said first residue.

Recycling of the cleaning formulation filtrate stream may lead to a reduction in the amount of water used in the methods described herein.

Alternatively, or in addition, in arrangements comprising a container in which effluent is collected prior to transferring the effluent to the treatment separator, preferably at least a portion of the cleaning formulation filtrate stream may be recycled to the container.

Alternatively, where the treatment separator is the first separator, the combined second filtrate stream and first filtrate stream may be recycled directly to further treat said residue. As such, the combined second filtrate stream and first filtrate stream may be recycled to further treat said residue without passing through a first fine grading separator. Alternatively, or in addition, at least a portion of the combined second filtrate stream and first filtrate stream may be recycled to the container without passing through a first fine grading separator.

In an alternative preferred embodiment, the treatment separator is distinct from the first separator. In this way, the method of treating the animal skin substrate comprises a process for recovery and cleaning of the solid particulate material in which an additional separator is required.

Where there is a separate first separator and treatment separator, the method preferably further comprises transferring said first residue to said treatment separator. The first residue may be transferred to the first separator by a feeding mechanism. The feeding mechanism may comprise pumping means, such as a pump suitable for transferring a mixture of liquid and solids; a vibratory feeder; a mechanical conveyer, such as a disc-driven system (such as a disc belt), an Archimedean screw, a conveyor belt; or pneumatic or vacuum conveying means. Alternatively or in addition, transferring the first residue to the treatment separator may comprise transferring the first residue under gravity.

Alternatively or in addition, transferring the first residue to the treatment separator may comprise collecting the first residue in a container and tipping the first residue out onto the treatment separator. For example, the first residue may be tipped out of the container by hand, or by using a mechanical device, such as a tipping skip, winch or forklift.

Preferably, said transferring the first residue to said treatment separator comprises pumping or vacuum conveying.

Preferably, in said transferring of the first residue to said treatment separator, the rate of transfer to the treatment separator is controlled by a first flow regulator. In this way, the movement of the first residue to the treatment separator can be controlled, which can reduce clogging of the separator by the solid particulate material. The flow regulator may be a valve, a rotary valve, or a narrowing in a portion of a flow pathway between the first separator and the treatment separator.

The inclusion of the first flow regulator, such as a rotary valve, is particularly preferred where the first residue is transferred to the treatment separator by vacuum conveying.

Where there is a separate first separator and treatment separator, the first separator may be comprised in a multilayer separator device in addition or alternatively to the treatment separator being comprised in a multilayer separating treatment apparatus.

Preferably said multilayer separator device comprises a second fine grading separator configured to allow treatment liquor to pass through but to prevent solid waste fragments from passing through. The second fine grading separator may be as defined hereinabove in relation to the first fine grading separator.

Preferably, the method comprises passing the first filtrate stream through said second fine grading separator to provide a third filtrate stream. In a further preferred embodiment, the method may comprise passing the first filtrate stream to a filtration apparatus which is or comprises a self-cleaning filter (as described hereinabove) to provide said third filtrate stream. Preferably, the method comprises recycling said third filtrate stream to the effluent.

Preferably, the methods disclosed herein further comprise recovering the cleaned solid particulate material from the treatment separator.

Where the treatment separator is comprised in a multilayer treatment apparatus, such as a vibratory separator, the multilayer treatment apparatus typically comprises a first port through which solid particulate material may exit from the treatment separator.

Additionally, said multilayer treatment apparatus may comprise a second port through which said material of a size substantially larger than said solid particulate material may exit from the coarse grading separator and/or said multilayer treatment apparatus may comprise a third port through which said solid waste fragments may exit from the fine grading separator.

Preferably, the methods disclosed herein comprise recycling said cleaned solid particulate material to further methods of treating animal skin substrates.

In any of the methods disclosed hereinabove, there may further comprise screening said effluent prior to transferring said effluent to the first separator, wherein said screening of said effluent comprises removal of at least a portion of said solid waste fragments from the treatment liquor.

Typically, the screening of said effluent comprises removal of solid waste fragments from the treatment liquor that are not attached to solid particulate material, for example, large pieces of animal skin substrate or solid waste fragments that float on the treatment liquor and/or are suspended in the treatment liquor. Removal of said solid waste fragments may be conducted using a net, a web or a mesh. Removal of said solid waste fragments may be conducted by an operator.

In a second aspect of the present disclosure, there is provided a method of cleaning solid particulate material recovered from an animal skin substrate treatment process in which said animal skin substrate had been treated with said solid particulate material, the method of cleaning comprising:

transferring the recovered solid particulate material to a treatment separator, wherein the treatment separator is configured to allow liquid and at least a portion of solid waste fragments derived from said substrate to pass through the separator but to prevent the solid particulate material from passing through the separator;

treating said recovered solid particulate material to remove residual solid waste fragments to provide cleaned solid particulate material, wherein said treating of said solid particulate material comprises retaining said solid particulate material on the surface of said treatment separator during said treating, and (i) directing a cleaning formulation onto said solid particulate material to provide a filtrate stream comprising said cleaning formulation and said residual solid waste fragments and a residue comprising cleaned solid particulate material; and/or (ii) agitating the treatment separator.

The description hereinabove of the terms used in the first aspect apply equally to the second aspect.

The method of the second aspect may further comprise a step prior to transferring the recovered solid particulate material of recovering the solid particulate material from an effluent of the animal skin substrate treatment process in which said animal skin substrate had been treated with said solid particulate material and a treatment liquor, wherein the effluent comprises said solid particulate material, the treatment liquor and solid waste fragments derived from said substrate.

Preferably, the step of recovering the solid particulate material comprises transferring the effluent to a first separator. Preferably the effluent comprises an effluent stream. The first separator is preferably as described hereinabove.

Alternatively, the step of recovering the solid particulate material preferably comprises removing solid particulate material from the effluent using a mechanical conveyor separator.

Preferably, the method comprises recycling said filtrate stream to further treat said recovered solid particulate material.

Preferably, the transferring of the recovered solid particulate material to the treatment separator is via a coarse grading separator, wherein the coarse grading separator is preferably as described hereinabove.

Alternatively or in addition, the method may further comprise passing the filtrate stream through a first fine grading separator to remove residual solid waste fragments to provide a cleaning formulation filtrate stream. Preferably, the first fine grading separator is as described hereinabove.

Preferably, the method may comprise recycling said cleaning formulation filtrate stream to further treat said recovered solid particulate material.

Preferably, in relation to any of the methods described hereinabove, said method is not:
(i) a method of treating at least one animal skin substrate comprising:
  agitating, for at least a first time period, the animal skin substrate with a solid particulate material and a treatment liquor in a rotatably mounted drum,
  opening an outlet opening of the drum
  agitating the animal skin substrate in the drum for a second time period, the drum further comprising an apertured screen arranged at the outlet and configured such that during said second time period solid particulate material and treatment liquor exit the drum through the outlet opening and the at least one animal skin substrate is retained in the drum, and
  collecting said solid particulate material in a collecting vessel;
or
(ii) a method of separating a multiplicity of solid particles from one or more animal skin substrates during a treatment process comprising:
  agitating said animal skin substrates with a multiplicity of solid particles and treatment liquor in a treatment volume of a rotatably mounted drum wherein the side-walls of said drum are not perforate,
  said drum having a collecting volume separated from the treatment volume by a partition, wherein said method further comprises allowing the solid particles and treatment liquor to pass through the partition from the treatment volume to the collecting volume whilst retaining said animal skin substrates in the treatment volume;
or
(iii) a method of recovering a solid particulate material from an animal skin substrate subjected to a treatment using said particulate material, the method comprising supporting the animal skin substrate on a support, directing an output flow of air from at least one air knife to the animal skin substrate and moving at least one of the air knife and the animal substrate relative to the other thereby to displace solid particulate material from the animal skin substrate.

In a third aspect of the present disclosure, there is provided a method of treating an animal skin substrate comprising:
  agitating the animal skin substrate with a solid particulate material and a treatment liquor;
  separating the animal skin substrate from effluent comprising the solid particulate material, the treatment liquor and solid waste fragments derived from said substrate;
  transferring the effluent to a first separator, wherein the first separator is configured to allow the treatment liquor and at least a portion of the solid waste fragments to pass through the first separator but to prevent the solid particulate material from passing through the first separator, and providing a first filtrate stream comprising treatment liquor and solid waste fragments and a first residue comprising solid particulate material and residual solid waste fragments;
  treating said first residue to remove said residual solid waste fragments to provide cleaned solid particulate material,
  wherein said treating of said first residue comprises retaining said solid particulate material on a surface of a treatment separator during said treating, wherein the treatment separator is configured to allow liquid and residual solid waste fragments to pass through but to prevent the solid particulate material from passing through;
wherein said method is not:
(i) a method of treating at least one animal skin substrate comprising:
  agitating, for at least a first time period, the animal skin substrate with a solid particulate material and a treatment liquor in a rotatably mounted drum,
  opening an outlet opening of the drum
  agitating the animal skin substrate in the drum for a second time period, the drum further comprising an apertured screen arranged at the outlet and configured such that during said second time period solid particulate material and treatment liquor exit the drum through the outlet opening and the at least one animal skin substrate is retained in the drum, and collecting said solid particulate material in a collecting vessel;
or
(ii) a method of separating a multiplicity of solid particles from one or more animal skin substrates during a treatment process comprising:
  agitating said animal skin substrates with a multiplicity of solid particles and treatment liquor in a treatment volume of a rotatably mounted drum wherein the side-walls of said drum are not perforate,
  said drum having a collecting volume separated from the treatment volume by a partition, wherein said method further comprises allowing the solid particles and treatment liquor to pass through the partition from the treatment volume to the collecting volume whilst retaining said animal skin substrates in the treatment volume;

or (iii) a method of recovering a solid particulate material from an animal skin substrate subjected to a treatment using said particulate material, the method comprising supporting the animal skin substrate on a support, directing an output flow of air from at least one air knife to the animal skin substrate and moving at least one of the air knife and the animal substrate relative to the other thereby to displace solid particulate material from the animal skin substrate.

The description hereinabove of the terms used in the first aspect apply equally to the third aspect.

In a fourth aspect of the present disclosure, there is provided an apparatus for treating an animal skin substrate with a solid particulate material and a treatment liquor, the apparatus comprising:
  a rotatably mounted drum for containing the animal skin substrate, the solid particulate material and the treatment liquor;
  an opening;
  a closure moveable between a closed position at which the closure prevents the animal skin substrate, the solid particulate material, the treatment liquor and solid waste fragments derived from said substrate passing through the opening and an open position at which the animal skin substrate, the solid particulate material, the treatment liquor and the solid waste fragments can pass through the opening;
  a container configured to capture the animal skin substrate, the solid particulate material, the treatment liquor and the solid waste fragments that pass through the opening;
  a treatment separator, wherein the treatment separator is configured to allow the treatment liquor and at least a portion of the solid waste fragments to pass through the treatment separator but to prevent the solid particulate material from passing through,
  a first flow pathway between the container and the treatment separator, wherein the container is configured so that the animal skin substrate is unable to exit the container along the first flow pathway;
  a pump configured to convey effluent comprising the solid particulate material, the treatment liquor and the solid waste fragments along the first flow pathway to the treatment separator;
  wherein the treatment separator is configured to retain the solid particulate material on a surface of the treatment separator; and
    (i) the apparatus comprises at least one nozzle arranged so as to direct a cleaning formulation onto the solid particulate material on the surface of the treatment separator; and/or
    (ii) the apparatus comprises a mechanism for agitating the treatment separator.

The description hereinabove of the terms used in the first aspect apply equally to the fourth aspect.

As used throughout the description in relation to all the aspects disclosed herein, the term "first flow pathway" refers to a route from the container to the treatment separator. The first flow pathway may comprise a pipe having an outlet. The effluent may exit the first flow pathway pipe through the outlet. The first flow pathway may be a duct.

Typically, the container may be unsealed, such as a trough or a skip, and comprise an opening to allow entry of the animal skin substrate, the solid particulate material, the treatment liquor and the solid waste fragments into the container and an outlet through which the effluent may exit into the first flow pathway. Alternatively, the container may be a sealed container comprising an opening through which the animal skin substrate, the solid particulate material, the treatment liquor and the solid waste fragments may enter the container along an enclosed pathway from the rotatably mounted drum and an outlet through which the effluent may exit into the first flow pathway.

The container is configured so that the animal skin substrate is unable to exit the container along the first flow pathway. Typically, the container comprises a separator, such as a grating, positioned between the opening and the outlet of the container which prevents the animal skin substrate from passing through but which allows the solid particulate material and the treatment liquor to pass through.

Preferably, the first flow pathway comprises a coarse grading separator, wherein said coarse grading separator is configured to allow said solid particulate material to pass through said coarse grading separator but to prevent material of a size substantially larger than said solid particulate material from passing through.

Alternatively or in addition, the apparatus preferably further comprises a first fine grading separator to remove solid waste fragments from the cleaning formulation that have passed through the treatment separator.

Preferably the treatment separator is comprised in a multilayer separating treatment apparatus comprising a first fine grading separator,
  wherein said first fine grading separator allows liquid to pass through but prevents solid waste fragments from passing through, and
  wherein the multilayer separating treatment apparatus is configured so that any material to be separated is exposed to the treatment separator before the fine grading separator.

Preferably, the multilayer separating treatment apparatus further comprises a coarse grading separator,
  wherein said coarse grading separator is configured to allow said solid particulate material to pass through but to prevent material of a size substantially larger than said solid particulate material from passing through, and
  wherein the multilayer separating treatment apparatus is configured so that any material to be separated is exposed to the coarse grading separator before the treatment separator Preferably, said multilayer separating treatment apparatus is a vibratory separator.

Preferably, the apparatus further comprises a fourth flow pathway for recycling to the treatment separator liquid that has passed through the first fine grading separator. Preferably, the liquid comprises or consists of the cleaning formulation and/or the treatment liquor. Typically, the fourth flow pathway comprises a pipe or a duct.

Alternatively, or in addition, the apparatus may comprise ducting or piping for recycling to the container and/or to the treatment separator, liquid that has passed through the treatment separator but that has not passed through a first fine grading separator.

Preferably, the treatment separator comprises a perforated sheet.

Preferably, the first flow pathway comprises a second flow regulator.

In a fifth aspect of the present disclosure, there is provided an apparatus for treating an animal skin substrate with a solid particulate material and a treatment liquor, the apparatus comprising:

a rotatably mounted drum for containing the animal skin substrate, the solid particulate material and the treatment liquor;

an opening;

a closure moveable between a closed position at which the closure prevents the animal skin substrate, the solid particulate material, the treatment liquor and solid waste fragments derived from said substrate passing through the opening and an open position at which the animal skin substrate, the solid particulate material, the treatment liquor and the solid waste fragments can pass through the opening;

a container configured to capture the animal skin substrate, the solid particulate material, the treatment liquor and the solid waste fragments that pass through the opening;

a first separator, wherein the first separator is configured to allow the treatment liquor and at least a portion of the solid waste fragments to pass through the first separator but to prevent the solid particulate material from passing through, a second flow pathway between the container and the first separator, wherein the container is configured so that the animal skin substrate is unable to exit the container along the second flow pathway;

a pump configured to convey effluent comprising the solid particulate material, the treatment liquor and the solid waste fragments along the second flow pathway to the first separator;

wherein the apparatus comprises a third flow pathway connecting the first separator and a treatment separator, wherein the third flow pathway is arranged so that said solid particulate material that is unable to pass through the first separator is able to move along the third flow pathway to the treatment separator, and wherein the treatment separator is configured to retain the solid particulate material on a surface of the treatment separator; and (i) the apparatus comprises at least one nozzle arranged so as to direct a cleaning formulation onto the solid particulate material on the surface of the treatment separator; and/or (j) the apparatus comprises a mechanism for agitating the treatment separator.

The description hereinabove of the terms used in the first aspect apply equally to the fifth aspect.

As used herein, the term "second flow pathway" refers to a route from the container to the first separator. The second flow pathway may comprise a pipe having an outlet. The effluent may exit the second flow pathway pipe through the outlet. The second flow pathway may be a duct.

Typically, the container may be unsealed, such as a trough or a skip, and comprise an opening to allow entry of the animal skin substrate, the solid particulate material, the treatment liquor and the solid waste fragments into the container and an outlet through which the effluent may exit into the second flow pathway. Alternatively, the container may be a sealed container comprising an opening through which the animal skin substrate, the solid particulate material, the treatment liquor and the solid waste fragments may enter the container an enclosed pathway from the rotatably mounted drum and an outlet through which the effluent may exit into the second flow pathway.

The container is configured so that the animal skin substrate is unable to exit the container along the second flow pathway. Typically, the container comprises a separator, such as a grating, positioned between the opening and the outlet of the container which prevents the animal skin substrate from passing through but which allows the solid particulate material and the treatment liquor to pass through.

Preferably, the second flow pathway comprises a coarse grading separator, wherein said coarse grading separator is configured to allow said solid particulate material to pass through said coarse grading separator but to prevent material of a size substantially larger than said solid particulate material from passing through.

Alternatively or in addition, the apparatus preferably further comprises a first fine grading separator to remove solid waste fragments from the cleaning formulation that have passed through the treatment separator.

Preferably the treatment separator is comprised in a multilayer separating treatment apparatus comprising a first fine grading separator, wherein said first fine grading separator allows liquid to pass through but prevents solid waste fragments from passing through, and wherein the multilayer separating treatment apparatus is configured so that any material to be separated is exposed to the treatment separator before the fine grading separator.

Preferably, the multilayer separating treatment apparatus further comprises a coarse grading separator, wherein said coarse grading separator is configured to allow said solid particulate material to pass through but to prevent material of a size substantially larger than said solid particulate material from passing through, and wherein the multilayer separating treatment apparatus is configured so that any material to be separated is exposed to the coarse grading separator before the treatment separator Preferably, said multilayer separating treatment apparatus is a vibratory separator.

Preferably, the apparatus further comprises a fourth flow pathway for recycling to the treatment separator cleaning formulation that has passed through the first fine grading separator. Typically, the fourth flow pathway comprises a pipe or a duct.

Alternatively, or in addition, the apparatus may comprise ducting or piping for recycling to the container and/or to the treatment separator, liquid that has passed through the treatment separator but that has not passed through a first fine grading separator.

Preferably, the treatment separator comprises a perforated sheet.

Preferably, the second flow pathway comprises a second flow regulator.

The third flow pathway is arranged so that solid particulate material that is unable to pass through the first separator may move along the third flow pathway to the treatment separator. The third flow pathway and the first separator may be arranged so that said solid particulate material is able to move along the third flow pathway to the treatment separator under gravity. Preferably the apparatus further comprises a second pump configured to convey the solid particulate material along the third flow pathway to the treatment separator. Preferably, the apparatus is configured so that the solid particulate material is moved along the third flow pathway to the treatment separator by vacuum conveying.

Typically, the third flow pathway comprises a pipe or a duct. Preferably, the third flow pathway comprises a first flow regulator.

Preferably, the first separator is comprised in a multilayer separator device. Preferably, said multilayer separator device comprises a second fine grading separator configured to allow treatment liquor to pass through but to prevent solid waste fragments from passing through.

In this arrangement, preferably the apparatus further comprises a fifth flow pathway for recycling to the second flow pathway and/or to the container, treatment liquor that has passed through the second fine grading separator. Typically, the fifth flow pathway comprises a pipe or a duct.

The disclosure is further illustrated by reference to the following drawings, wherein.

Figure 1:
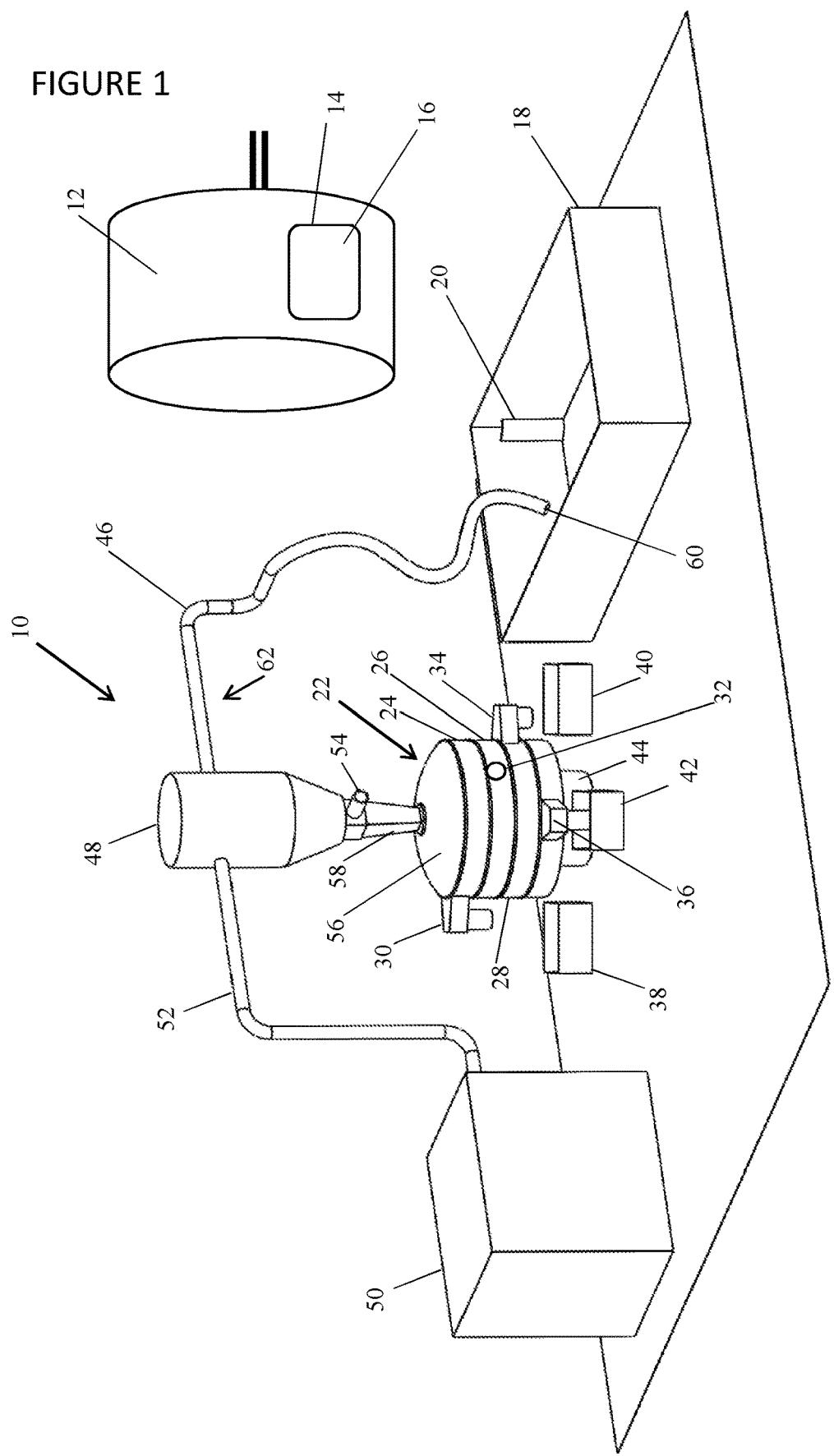
FIG. 1 shows an external perspective view of an apparatus according to the disclosure.

With reference to FIG. 1, there is provided an apparatus (10) according to an aspect of the present disclosure for treating an animal skin substrate with a solid particulate material and a treatment liquor. The apparatus (10) comprises a rotatably mounted drum (12) for containing the animal skin substrate, the solid particulate material and the treatment liquor. The rotatably mounted drum (12) comprises an opening (14) and a closure (16) moveable between a closed position at which the closure prevents the animal skin substrate, the solid particulate material, the treatment liquor and solid waste fragments derived from said substrate passing through the opening and an open position at which the animal skin substrate, the solid particulate material, the treatment liquor and the solid waste fragments can pass through the opening. FIG. 1 shows the closure (16) in the closed position, that is, covering the opening (14).

The apparatus (10) comprises a container (18) configured to capture the animal skin substrate and effluent comprising the solid particulate material, the treatment liquor and the solid waste fragments that pass through the opening (14) when the closure (16) is in an open position.

The container (18) is open-topped, which allows an operator to remove an animal skin substrate (not shown). Optionally, the animal skin substrate may be separated from the effluent prior to the effluent being transferred into the container (18). An operator may also remove solid waste fragments (not shown) floating on or suspended in the treatment liquor in the container (18), for example, using a net or sieve (not shown). The container (18) has a filtration drain (20) through which liquid effluent can be removed, if needed. The filtration drain (20) comprises a grill to prevent solid material exiting the container (18).

The apparatus (10) comprises a multilayer separating treatment apparatus (22). The multilayer separating treatment apparatus (22) comprises a coarse grading separator (24), a treatment separator (26) and a first fine grading separator (28).

The coarse grading separator (24) is comprised in a layer of the multilayer separating treatment apparatus (22) that has a large items port (30) for removing the material of a size substantially larger than the solid particulate material that has not passed through the coarse grading separator (24). Material that exits the large items port (30) is collected in a large items collection container (38).

The treatment separator (26) is comprised in a layer of the multilayer separating treatment apparatus (22) that has a solid particulate material port (32) for removing the cleaned solid particulate material.

The first fine grading separator (28) is comprised in a layer of the multilayer separating treatment apparatus (22) that has a solid waste fragments port (34) for removing the material that has not passed through the first fine grading separator (28). Material that exits the solid waste fragments port (34) is collected in a solid waste fragments collection container (40).

The multilayer separating treatment apparatus (22) also has a liquid port (36) for removing liquid, such as treatment liquor and cleaning formulation, which has filtered through the first fine grading separator (28). Material that exits the liquid port (36) is collected in a liquid collection container (42).

The apparatus (10) comprise a mechanism for vibrating (44) the multilayer separating treatment mechanism (22).

Within the multilayer separating treatment apparatus are spraying nozzles (not shown, but indicated in location 56) for spraying cleaning formulation onto solid particulate material on the treatment separator (26).

A first pipe (46) having an inlet (60) connects the container (18) and a hopper (48), which may be a cyclonic collector. A vacuum pump (50) is connected to the hopper (48) by a second pipe (52). When the vacuum pump (50) is operated, the effluent of the animal skin substrate treatment process that is captured in the container (18) may be vacuum conveyed to the hopper (48). In the arrangement shown in FIG. 1, the animal skin substrate may be removed from the container (10) prior to operation of the vacuum pump to prevent blockage of the first pipe (46).

Optionally, treatment liquor may be drained from the container (18) via filtration drain (20) such that the effluent that is conveyed from the container (18) to the hopper (48) comprises essentially solid particulate material and solid waste fragments.

A rotary valve (54) is located between the hopper (48) and the multilayer separating treatment apparatus (22) and regulates the flow of the effluent to the multilayer separating treatment apparatus (22). The rotary valve (54) is also required in order to facilitate vacuum conveying of the effluent.

The first pipe (46), the hopper (48), the rotary valve (54) and a connector (58) are comprised in a first flow pathway (62) from the container (18) to the treatment separator (26). The connector (58) may additionally comprise an additional coarse grading separator (not shown) to remove large-sized materials from the effluent prior to reaching the multilayer separating treatment apparatus (22).

Figure 2:
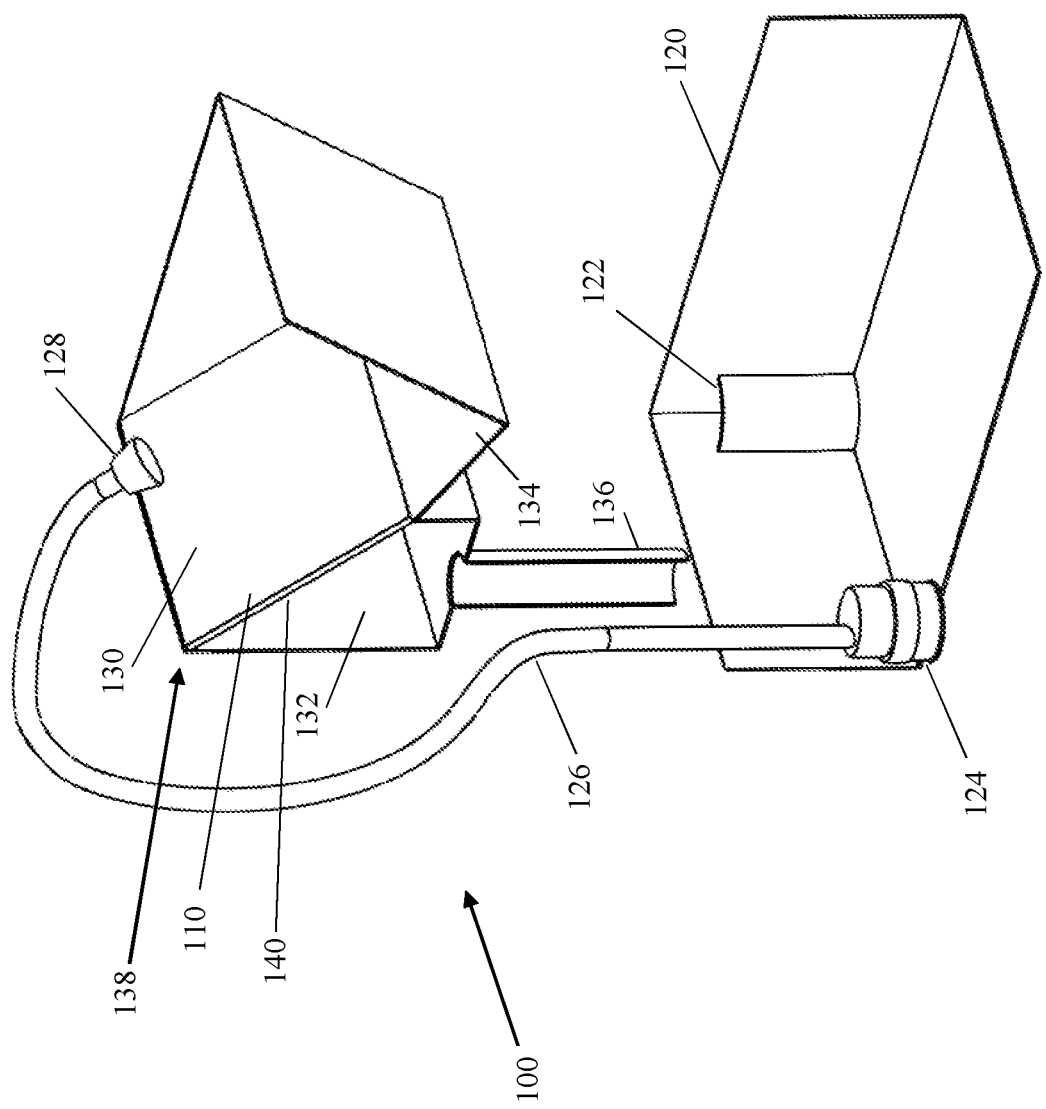
FIG. 2 shows a cross-sectional perspective view of a portion of an apparatus according to the disclosure.
Figure 3:
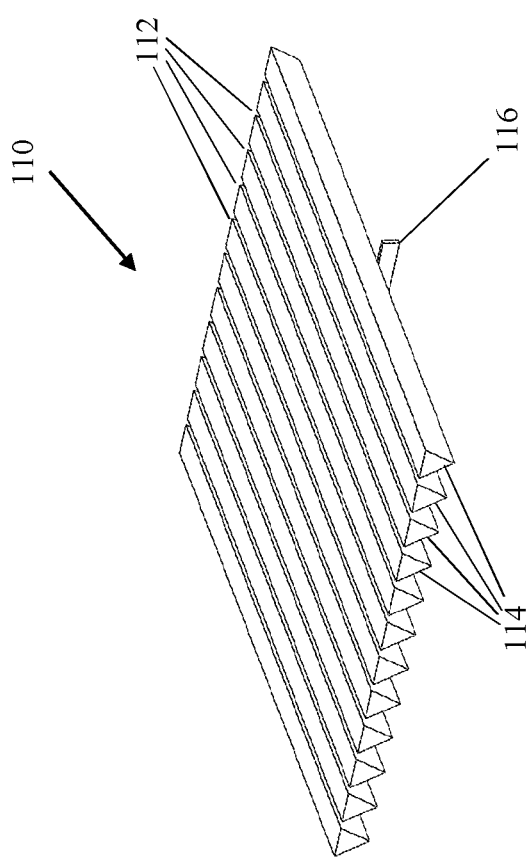
FIG. 3 shows a perspective view of a first separator according to the disclosure comprised in the apparatus of FIG. 2.

With reference to FIGS. 2 and 3, there is shown a cross-sectional view of a portion of the apparatus (100) according to the disclosure, comprising a first separator (110). The first separator (110) is shown in more detail in FIG. 3 and comprises a plurality of apertures (112). The apertures are formed of gaps between multiple wedge-shaped rods (114) arranged substantially in parallel. The wedge-shaped rods are retained in position by a cross bar (116).

The apparatus (100) comprises a container (120) for effluent comprising solid particulate material, treatment liquor and solid waste fragments following a process of treating the animal skin substrate with the solid particulate material and treatment liquor. The container (120) may also contain the animal skin substrate that has been processed or the animal skin substrate may be separated from the effluent prior to the effluent being transferred into the container.

The container (120) is open-topped, which allows an operator to remove an animal skin substrate (not shown), if present. The operator may also remove solid waste fragments (not shown) floating on or suspended in the treatment liquor, for example, using a net or sieve (not shown). The container (120) has a filtration drain (122) through which liquid effluent can be removed, if needed. The filtration drain (122) comprises a grill to prevent solid material exiting the container (120) through the drain).

The apparatus (100) comprises a solids handling submersible pump (124), preferably comprising a potential flow regulator shroud to ensure efficient pumping of an effluent rich in solid particulate material. The apparatus has a pipe (126) connected to the pump (124) and through which the pump (124) conveys the effluent from the container (120) to the first separator (110). The pipe (126) has a nozzle (128), which is preferably profiled to ensure that the effluent leaving the pipe (126) is spread across the surface (130) of the first separator (110).

The first separator (110) is configured to allow treatment liquor and at least a portion of solid waste fragments in the effluent to pass through the first separator (110) but to prevent the solid particulate material from passing through.

The first separator (110) is comprised in a multilayer separator device (138) that comprises a second fine grading separator (140). The second fine grading separator (140) is positioned beneath the first separator (110) and is configured to allow treatment liquor to pass through but to prevent solid waste fragments from passing through.

The apparatus (100) comprises a first collection chamber (132) in which a third filtrate stream comprising treatment liquor that has passed through the second fine grading separator (140) is collected. The second fine grading separator (140) can be removed periodically from the apparatus (100) in order to remove solid waste fragments that have passed through the first separator (110) but have not passed through the second fine grading separator (140).

The apparatus also comprises a second collection chamber (134) to collect a first residue comprising solid particulate material and solid waste fragments that do not pass through the first separator (110).

The apparatus has a return pipe (136) that enables the third filtrate comprising treatment liquor that has passed through the second fine grading separator (140) to be recycled to the container (120).

In use, the first residue that collects in the second collection chamber (134) is transferred to a treatment separator, such as the one shown in FIG. 1 or described below in relation to FIG. 4 in order to carry out treating of the first residue.

Figure 4:
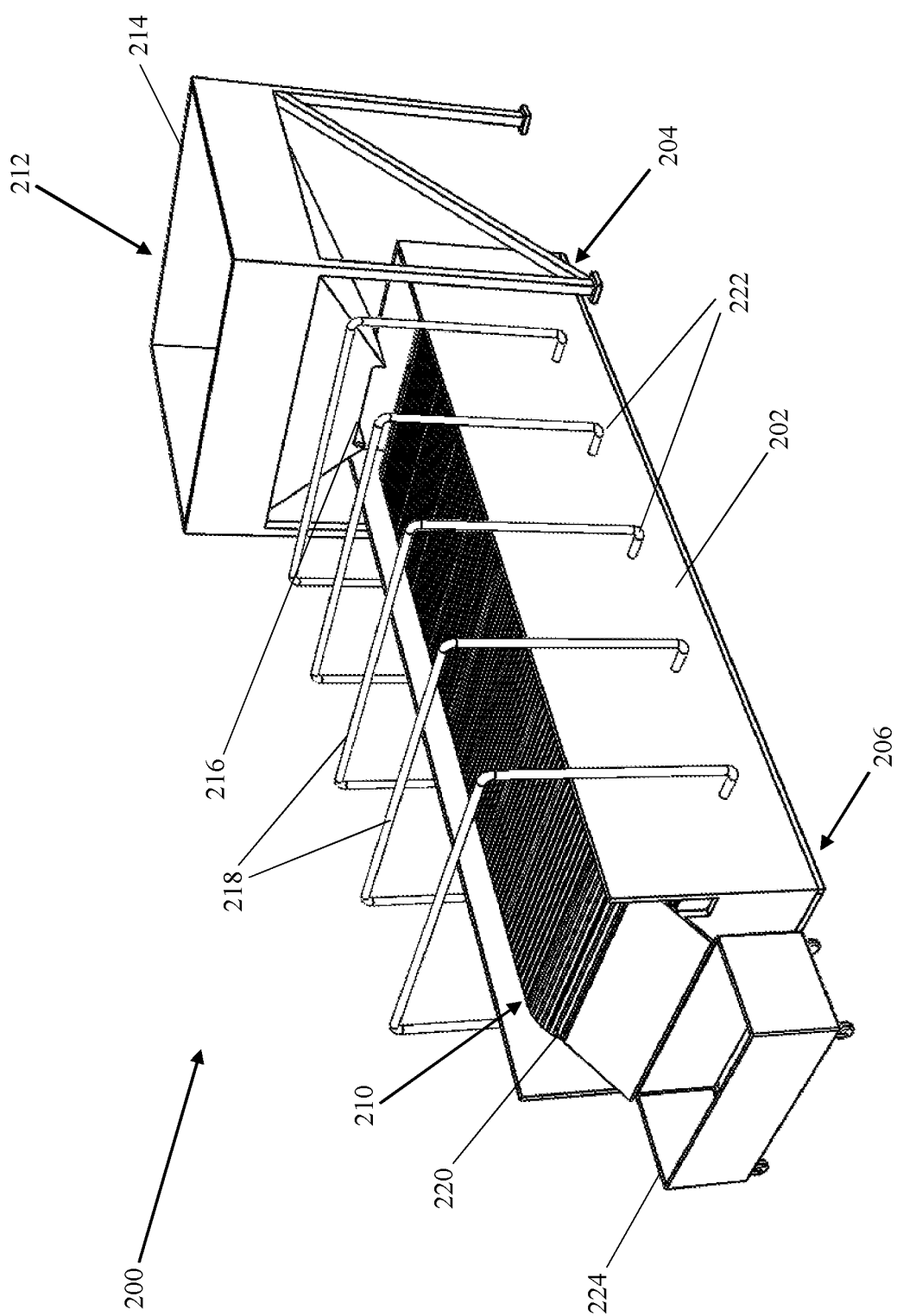
FIG. 4 shows an external perspective view of an apparatus according to the disclosure.

With reference to FIG. 4, there is provided an apparatus comprises a housing (202) on which is mounted a treatment separator (210). The treatment separator (210) is a continuous belt having apertures (220). Spaced apart along the housing (202) are a plurality of ducts (222) comprising spray nozzles (218). The spray nozzles (218) are arranged in order to direct cleaning formulation onto the treatment separator (210). At one end (204) of the housing (202) is a hopper (212) having an inlet (214) and an outlet (216). The hopper (212) is configured such that material that is introduced into the inlet (214) of the hopper (212), is able to pass through the hopper (212) and exits through the outlet (216) where it drops onto the treatment separator (210) at one end (204) of the housing. At a second end (206) of the housing (202) is a skip (224).

In use, material, such as effluent comprising solid particulate material, treatment liquor and solid waste fragments or, alternatively, solid particulate material that has been separated from the effluent but which is contaminated with solid waste fragments is introduced into the hopper (212) through the inlet (214). The shape of the hopper (212) regulates flow of the solid particulate material, solid waste fragments and optionally treatment liquor through the outlet (216) of the hopper and onto the treatment separator (210).

The continuous belt of the treatment separator (210) moves material retained on the treatment separator from one end (204) of the housing towards the second end (206) of the housing. As the treatment separator (210) moves, the solid particulate material and solid waste fragments move with it and are sprayed by cleaning formulation from spray nozzles (218) and are also agitated by the movement of the continuous belt. The spraying with cleaning formulation from spray nozzles (218) and the agitation of the solid particulate material causes solid waste fragments to be removed from the solid particulate material. The solid waste fragments removed from the solid particulate material pass through or are held in the apertures (220) of the treatment separator (210). On reaching the second end (206) of the housing, cleaned solid particulate material falls into the skip (224) ready for collection and re-use in subsequent animal skin substrate treatment methods.

Cleaning formulation, solid waste fragments and any treatment liquor introduced into the hopper and that pass through the treatment separator (210) are directed to a first fine grading separator (not shown) within the housing (202) to remove solid waste fragments from the cleaning formulation and treatment liquor (where present). The cleaning formulation and treatment liquor are collected in a sump (not shown) in the housing (202) beneath the treatment separator (210) and are recycled to the spray nozzles (218) via the ducts (222).

Figure 5:
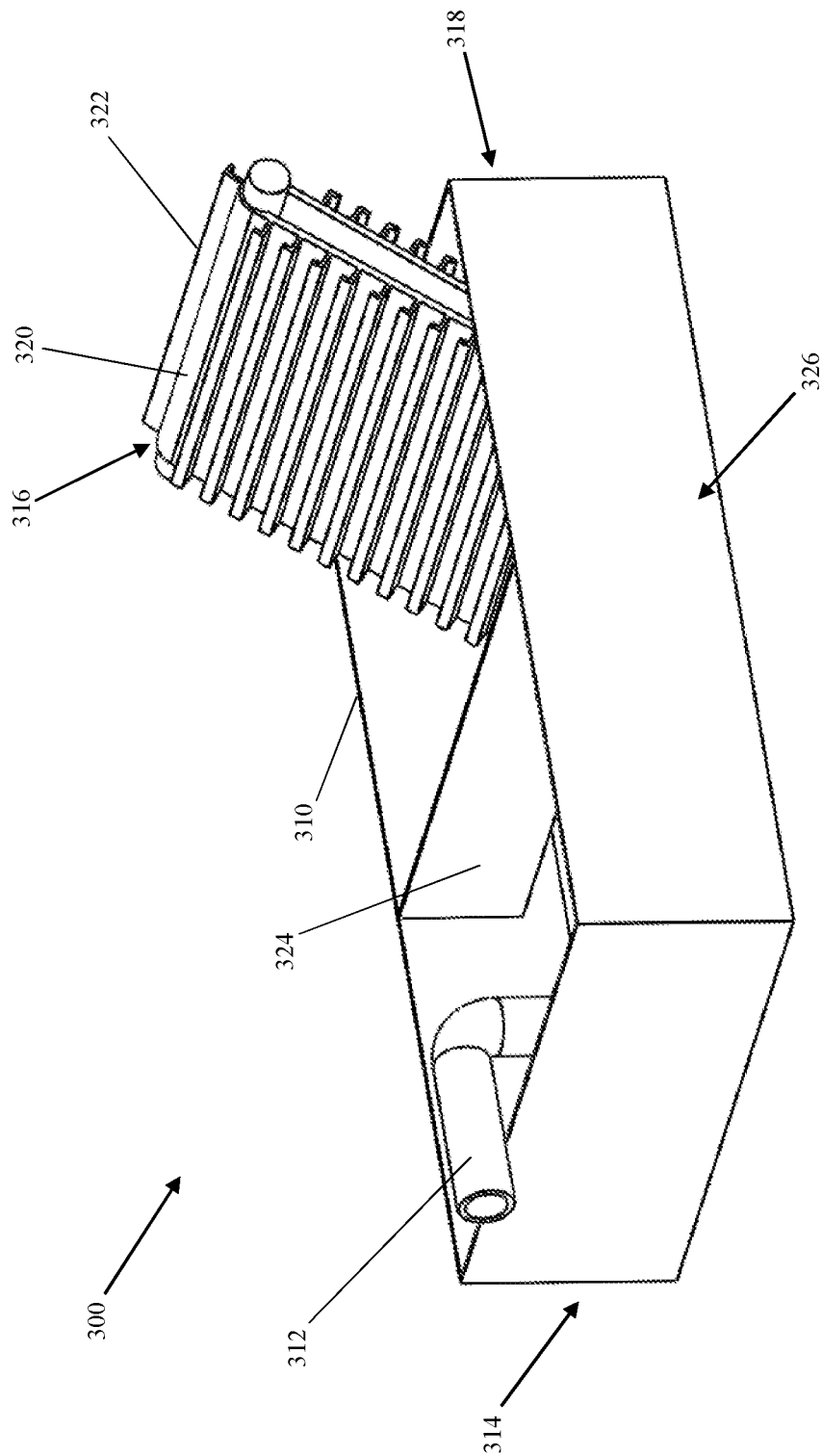
FIG. 5 shows an external perspective view of a portion of an apparatus comprising a mechanical conveyor separator for use in methods of the present disclosure.

With reference to FIG. 5, there is provided an apparatus (300). The apparatus comprises a container (310) for an effluent comprising solid particulate material, treatment liquor and solid waste fragments following a process of treating the animal skin substrate with the solid particulate material and treatment liquor. The effluent enters the container (310) through an inlet pipe (312) at a first end (314) of the container (310). A mechanical conveyor separator (316) is positioned at a second end (318) of the container (310). The mechanical conveyor separator (316) comprises a belt (320) and a plurality of linear scoops (322) arranged on the belt (320).

The container (310) has a weir (324) positioned between the first end (314) and the second end (318) of the container (310). The weir (324) is arranged so as to assist in preventing solid waste fragments that are floating on the treatment liquor or which are suspended in the treatment liquor from moving towards the second end (318) of the container (310).

In use, effluent comprising solid particulate material, treatment liquor and solid waste fragments is pumped into the container (310) via the inlet pipe (312). Solid particulate material in the container (310) sinks or settles to a bottom portion (326) of the container (310). In operation of the mechanical conveyor separator (316), the belt (320) moves and any material in the region of the bottom portion (326) of the container (310), including solid particulate material that has settled at the bottom portion (326), may be picked up by the plurality of linear scoops (322) and lifted out of the container (310). After the solid particulate material is lifted out of the container (310) by the mechanical conveyor separator (316), the solid particulate material may be recovered and taken for cleaning.

Figure 6:
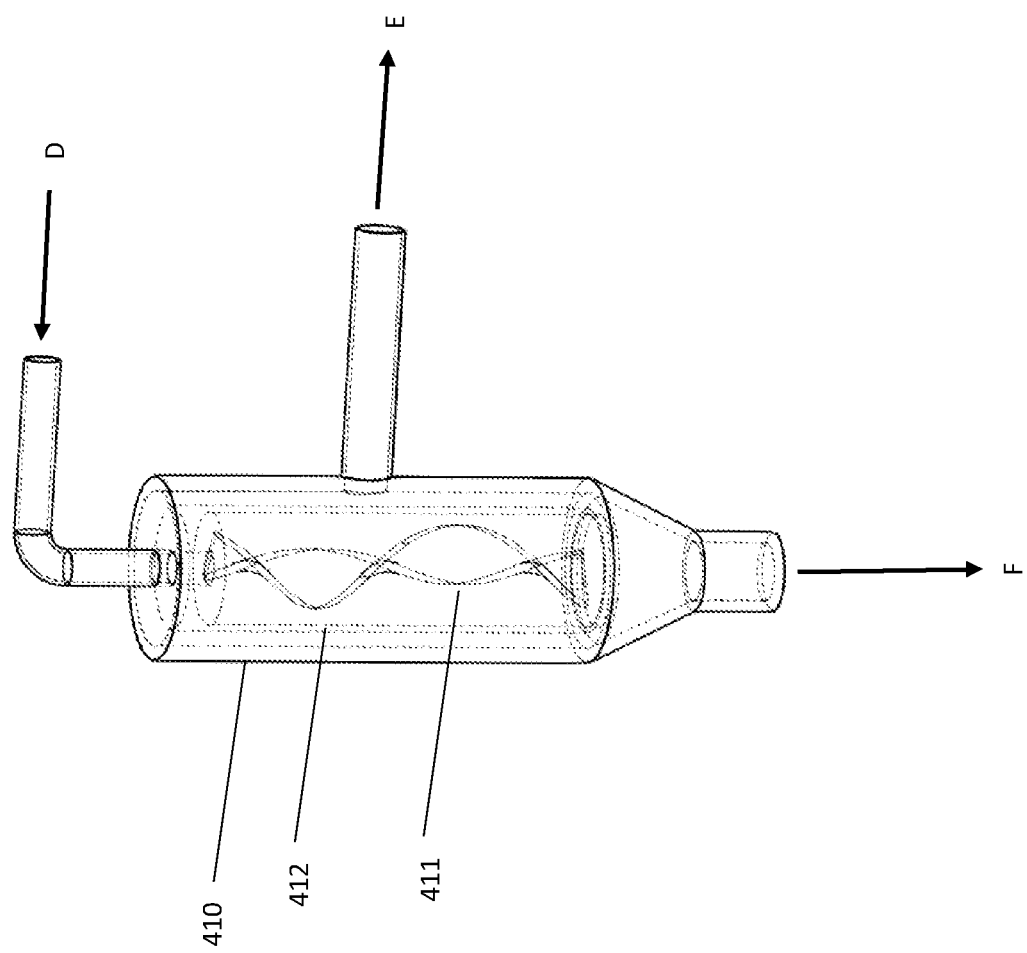
FIG. 6 shows a self-cleaning helical filter.

With reference to FIG. 6, there is illustrated a self-cleaning helical filter (410) comprising a helical cleaning element (411) and filter (412), wherein stream (D) is a stream comprising solid waste fragments and liquid; stream (E) is a liquid filtrate stream; and stream (F) is residue comprising solid waste fragments.

The invention claimed is:

1. A method of treating an animal skin substrate comprising:
agitating the animal skin substrate with a solid particulate material and a treatment liquor;
separating the animal skin substrate from effluent comprising the solid particulate material, the treatment liquor and solid waste fragments derived from said substrate;
transferring the effluent to a first separator, wherein the first separator is configured to allow the treatment liquor and at least a portion of the solid waste fragments to pass through the first separator but to prevent the solid particulate material from passing through the first separator, and providing a first filtrate stream comprising treatment liquor and solid waste fragments and a first residue comprising solid particulate material and residual solid waste fragments;
treating said first residue to remove said residual solid waste fragments to provide cleaned solid particulate material,
wherein said treating of said first residue comprises retaining said solid particulate material on a surface of a treatment separator during said treating, wherein the treatment separator is configured to allow liquid and residual solid waste fragments to pass through but to prevent the solid particulate material from passing through; and
(i) directing a cleaning formulation onto said solid particulate material to provide a second filtrate stream comprising said cleaning formulation and said residual solid waste fragments and a second residue comprising cleaned solid particulate material; and/or
(ii) agitating the treatment separator.

2. The method of claim 1, wherein said treating of said first residue comprises (i) directing a cleaning formulation onto said solid particulate material to provide a second filtrate stream comprising said cleaning formulation and said residual animal skin substrate and a second residue comprising cleaned solid particulate material, and (ii) agitating the treatment separator, wherein the directing step (i) and the agitating step (ii) are conducted simultaneously or sequentially.

3. The method of claim 1, further comprising passing the second filtrate stream through a first fine grading separator to remove residual solid waste fragments to provide a cleaning formulation filtrate stream.

4. The method of claim 3, comprising recycling said cleaning formulation filtrate stream to further treat said first residue.

5. The method of claim 1 wherein the treatment separator is comprised in a multilayer separating treatment apparatus comprising a coarse grading separator and a first fine grading separator,
wherein said coarse grading separator is configured to allow said solid particulate material to pass through but to prevent material of a size larger than said solid particulate material from passing through,
wherein said first fine grading separator allows liquid to pass through but prevents solid waste fragments from passing through, and
wherein the multilayer separating treatment apparatus is configured so that any material to be separated is exposed to the coarse grading separator before the treatment separator and is exposed to the treatment separator before the fine grading separator.

6. The method of claim 5, wherein said multilayer separating treatment apparatus is a vibratory separator.

7. The method of claim 1, wherein the first separator is comprised as part of a moving conveying mechanism.

8. The method of claim 1, wherein the treatment separator vibrates, rotates, or is subjected to a reciprocating motion or a linear motion in a single direction.

9. The method of claim 1, wherein the cleaning formulation is directed onto the solid particulate material on the treatment separator via one or more spraying means.

10. The method of claim 1, further comprising recovering the cleaned solid particulate material from the treatment separator.

11. The method of claim 10, further comprising recycling said cleaned solid particulate material to further methods of treating animal skin substrates.

12. The method of claim 1, wherein said transferring the effluent to said first separator comprises pumping or vacuum conveying.

13. The method of claim 1, comprising recycling said first filtrate stream to the effluent.

14. A method of cleaning solid particulate material recovered from an animal skin substrate treatment process in which said animal skin substrate had been treated with said solid particulate material, the method of cleaning comprising:
transferring the recovered solid particulate material to a treatment separator, wherein the treatment separator is configured to allow liquid and at least a portion of solid waste fragments derived from said substrate to pass through the treatment separator but to prevent the solid particulate material from passing through the separator;
treating said recovered solid particulate material to remove residual solid waste fragments to provide cleaned solid particulate material,
wherein said treating of said solid particulate material comprises retaining said solid particulate material on the surface of said treatment separator during said treating, and
(i) directing a cleaning formulation onto said solid particulate material to provide a filtrate stream comprising said cleaning formulation and said residual solid waste fragments and a residue comprising cleaned solid particulate material; and/or
(ii) agitating the treatment separator.

15. The method of claim 1, wherein said method is not:
(i) a method of treating at least one animal skin substrate comprising:
agitating, for at least a first time period, the animal skin substrate with a solid particulate material and a treatment liquor in a rotatably mounted drum,
opening an outlet opening of the drum
agitating the animal skin substrate in the drum for a second time period, the drum further comprising an apertured screen arranged at the outlet and configured such that during said second time period solid particulate material and treatment liquor exit the drum through the outlet opening and the at least one animal skin substrate is retained in the drum, and collecting said solid particulate material in a collecting vessel;

or (ii) a method of separating a multiplicity of solid particles from one or more animal skin substrates during a treatment process comprising:

agitating said animal skin substrates with a multiplicity of solid particles and treatment liquor in a treatment volume of a rotatably mounted drum wherein the side-walls of said drum are not perforate, said drum having a collecting volume separated from the treatment volume by a partition, wherein said method further comprises allowing the solid particles and treatment liquor to pass through the partition from the treatment volume to the collecting volume whilst retaining said animal skin substrates in the treatment volume;

or (iii) a method of recovering a solid particulate material from an animal skin substrate subjected to a treatment using said particulate material, the method comprising supporting the animal skin substrate on a support, directing an output flow of air from at least one air knife to the animal skin substrate and moving at least one of the air knife and the animal substrate relative to the other thereby to displace solid particulate material from the animal skin substrate.

16. A method of treating an animal skin substrate comprising:

agitating the animal skin substrate with a solid particulate material and a treatment liquor;

separating the animal skin substrate from effluent comprising the solid particulate material, the treatment liquor and solid waste fragments derived from said substrate;

transferring the effluent to a first separator, wherein the first separator is configured to allow the treatment liquor and at least a portion of the solid waste fragments to pass through the first separator but to prevent the solid particulate material from passing through the first separator, and providing a first filtrate stream comprising treatment liquor and solid waste fragments and a first residue comprising solid particulate material and residual solid waste fragments;

treating said first residue to remove said residual solid waste fragments to provide cleaned solid particulate material, wherein said treating of said first residue comprises retaining said solid particulate material on a surface of a treatment separator during said treating, wherein the treatment separator is configured to allow liquid and residual solid waste fragments to pass through but to prevent the solid particulate material from passing through;

wherein said method is not:

(i) a method of treating at least one animal skin substrate comprising:

agitating, for at least a first time period, the animal skin substrate with a solid particulate material and a treatment liquor in a rotatably mounted drum, opening an outlet opening of the drum agitating the animal skin substrate in the drum for a second time period, the drum further comprising an apertured screen arranged at the outlet and configured such that during said second time period solid particulate material and treatment liquor exit the drum through the outlet opening and the at least one animal skin substrate is retained in the drum, and collecting said solid particulate material in a collecting vessel;

or (ii) a method of separating a multiplicity of solid particles from one or more animal skin substrates during a treatment process comprising:

agitating said animal skin substrates with a multiplicity of solid particles and treatment liquor in a treatment volume of a rotatably mounted drum wherein the side-walls of said drum are not perforate, said drum having a collecting volume separated from the treatment volume by a partition, wherein said method further comprises allowing the solid particles and treatment liquor to pass through the partition from the treatment volume to the collecting volume whilst retaining said animal skin substrates in the treatment volume;

or (iii) a method of recovering a solid particulate material from an animal skin substrate subjected to a treatment using said particulate material, the method comprising supporting the animal skin substrate on a support, directing an output flow of air from at least one air knife to the animal skin substrate and moving at least one of the air knife and the animal substrate relative to the other thereby to displace solid particulate material from the animal skin substrate.

17. An apparatus for treating an animal skin substrate with a solid particulate material and a treatment liquor, the apparatus comprising:

a rotatably mounted drum for containing the animal skin substrate, the solid particulate material and the treatment liquor;

an opening;

a closure moveable between a closed position at which the closure prevents the animal skin substrate, the solid particulate material, the treatment liquor and solid waste fragments derived from said substrate passing through the opening and an open position at which the animal skin substrate, the solid particulate material, the treatment liquor and the solid waste fragments can pass through the opening;

a container configured to capture the animal skin substrate, the solid particulate material, the treatment liquor and the solid waste fragments that pass through the opening;

a treatment separator, wherein the treatment separator is configured to allow the treatment liquor and at least a portion of the solid waste fragments to pass through the treatment separator but to prevent the solid particulate material from passing through, a first flow pathway between the container and the treatment separator, wherein the container is configured so that the animal skin substrate is unable to exit the container along the first flow pathway;

a pump configured to convey effluent comprising the solid particulate material, the treatment liquor and the solid waste fragments along the first flow pathway to the treatment separator;

wherein the treatment separator is configured to retain the solid particulate material on a surface of the first separator; and (i) the apparatus comprises at least one nozzle arranged so as to direct a cleaning formulation onto the solid particulate material on the surface of the treatment separator; and/or (ii) the apparatus comprises a mechanism for agitating the treatment separator.

18. The apparatus of claim 17, wherein the first flow pathway comprises a coarse grading separator, wherein said coarse grading separator is configured to allow said solid particulate material to pass through said coarse grading separator but to prevent material of a size larger than said solid particulate material from passing through.

19. The apparatus of claim 17, further comprising a first fine grading separator to remove residual solid waste fragments from the cleaning formulation that has passed through the treatment separator.

20. The apparatus of claim 17, wherein the treatment separator is comprised in a multilayer separating treatment apparatus comprising a first fine grading separator,
   wherein said first fine grading separator allows liquid to pass through but prevents solid waste fragments from passing through, and
   wherein the multilayer separating treatment apparatus is configured so that any material to be separated is exposed to the treatment separator before the fine grading separator.

21. The apparatus of claim 20, wherein the multilayer separating treatment apparatus further comprises a coarse grading separator,
   wherein said coarse grading separator is configured to allow said solid particulate material to pass through but to prevent material of a size larger than said solid particulate material from passing through, and
   wherein the multilayer separating treatment apparatus is configured so that any material to be separated is exposed to the coarse grading separator before the treatment separator.

22. The apparatus of claim 20, wherein said multilayer separating treatment apparatus is a vibratory separator.

23. The apparatus of claim 17, wherein the first separator is comprised as part of a moving conveying mechanism.

24. An apparatus for treating an animal skin substrate with a solid particulate material and a treatment liquor, the apparatus comprising:
   a rotatably mounted drum for containing the animal skin substrate, the solid particulate material and the treatment liquor;
   an opening;
   a closure moveable between a closed position at which the closure prevents the animal skin substrate, the solid particulate material, the treatment liquor and solid waste fragments derived from said substrate passing through the opening and an open position at which the animal skin substrate, the solid particulate material, the treatment liquor and the solid waste fragments can pass through the opening;
   a container configured to capture the animal skin substrate, the solid particulate material, the treatment liquor and the solid waste fragments that pass through the opening;
   a first separator, wherein the first separator is configured to allow the treatment liquor and at least a portion of the solid waste fragments to pass through the first separator but to prevent the solid particulate material from passing through,
   a second flow pathway between the container and the first separator, wherein the container is configured so that the animal skin substrate is unable to exit the container along the second flow pathway;
   a pump configured to convey effluent comprising the solid particulate material, the treatment liquor and the solid waste fragments along the second flow pathway to the first separator;
   wherein the apparatus comprises a third flow pathway connecting the first separator and a treatment separator, wherein the third flow pathway is arranged so that said solid particulate material that is unable to pass through the first separator is able to move along the third flow pathway to the treatment separator, and wherein the treatment separator is configured to retain the solid particulate material on a surface of the treatment separator; and
   (i) the apparatus comprises at least one nozzle arranged so as to direct a cleaning formulation onto the solid particulate material on the surface of the treatment separator; and/or
   (ii) the apparatus comprises a mechanism for agitating the treatment separator.

25. The apparatus of claim 24, wherein the second flow pathway comprises a coarse grading separator, wherein said coarse grading separator is configured to allow said solid particulate material to pass through said coarse grading separator but to prevent material of a size larger than said solid particulate material from passing through.

26. The apparatus of claim 24, wherein the treatment separator is comprised in a multilayer separating treatment apparatus comprising a first fine grading separator,
   wherein said first fine grading separator allows liquid to pass through but prevents solid waste fragments from passing through, and
   wherein the multilayer separating treatment apparatus is configured so that any material to be separated is exposed to the treatment separator before the fine grading separator.

27. The apparatus of claim 24, wherein the apparatus comprises at least one nozzle arranged so as to direct a cleaning formulation onto the solid particulate material on the surface of the treatment separator.

28. The apparatus of claim 26, wherein said multilayer separating treatment apparatus is a vibratory separator.

29. The apparatus of claim 24, wherein the first separator is comprised as part of a moving conveying mechanism.

* * * * *